(12) United States Patent
Kirsebom et al.

(10) Patent No.: US 12,205,302 B2
(45) Date of Patent: Jan. 21, 2025

(54) FINE-SCALE MOVEMENT TRACKING OF UNDERWATER OBJECTS

(71) Applicant: Innovasea Marine Systems Canada Inc., Bedford (CA)

(72) Inventors: Oliver Sølund Kirsebom, Halifax (CA); Kayalvizhi Thanigainathan, Halifax (CA); Matthew Charles Richard, Halifax (CA); Frank Ian Smith, Halifax (CA); David Allen Ouellette, Seattle, WA (US); Samuel Victor Johnston, Seattle, WA (US)

(73) Assignee: Innovasea Marine Systems Canada Inc., Bedford (CA)

( * ) Notice: Subject to any disclaimer, the term of this patent is extended or adjusted under 35 U.S.C. 154(b) by 224 days.

(21) Appl. No.: 18/065,202

(22) Filed: Dec. 13, 2022

(65) Prior Publication Data
US 2023/0245324 A1    Aug. 3, 2023

Related U.S. Application Data

(60) Provisional application No. 63/305,720, filed on Feb. 2, 2022.

(51) Int. Cl.
*G06T 7/20* (2017.01)
*G06T 3/40* (2006.01)
(Continued)

(52) U.S. Cl.
CPC .............. *G06T 7/215* (2017.01); *G06T 3/40* (2013.01); *G06T 11/00* (2013.01);
(Continued)

(58) Field of Classification Search
None
See application file for complete search history.

(56) References Cited

U.S. PATENT DOCUMENTS

2020/0245921 A1 *  8/2020  Li ........................ A61B 5/0059
2020/0284903 A1 *  9/2020  Zach ......................... G01S 7/56

FOREIGN PATENT DOCUMENTS

WO     WO-0118562 A1 *  3/2001  ............. G01S 15/46

OTHER PUBLICATIONS

Written Opinion of the International Searching Authority for International Application No. PCT/CA2023/050127 mailed May 8, 2023, 5 pages.

(Continued)

*Primary Examiner* — Tapas Mazumder
(74) *Attorney, Agent, or Firm* — Christopher A. Baxter; Pierce Atwood LLP

(57) ABSTRACT

Techniques for performing fine-scale movement tracking of underwater objects are described. A computing device or system may receive timestamps corresponding to acoustic signals detected using an underwater acoustic receiver. The device or system may select a period of a known acoustic transmitter, and generate raw image data plotting the timestamps as graphical elements with respect to a first axis corresponding to linear time, and a second axis having a magnitude corresponding to the selected period. A first machine learning (ML) model may process the raw image data to generate segmented image data include a subset of the graphical elements determined to correspond to the selected period. A portion of the segmented image data, including the graphical elements, may be input to a second ML model to generate image data comprising a subset of the graphical elements corresponding to the selected period.

30 Claims, 14 Drawing Sheets

(51) Int. Cl.
  *G06T 7/215* (2017.01)
  *G06T 11/00* (2006.01)
  *H04B 11/00* (2006.01)

(52) U.S. Cl.
  CPC .............. *G06T 2207/20021* (2013.01); *G06T 2207/20081* (2013.01); *G06T 2207/20084* (2013.01); *H04B 11/00* (2013.01)

(56) References Cited

OTHER PUBLICATIONS

Allken et al., "Fish species identification using a convolutional neural network trained on synthetic data", ICES Journal of Marine Science, 76(1), pp. 342-349, Oct. 17, 2018 (Oct. 17, 2018).

Alaba et al., "Class-Aware Fish Species Recognition Using Deep Learning for an Imbalanced Dataset", Sensors 22, No. 21: 8268, pp. 1-18, Oct. 28, 2022 (Oct. 28, 2022).

Didar, M., "Implementation of deep learning framework—Unet, using Keras," GitHub Repository (2019). https://github.com/mossydidar/unet-1, 6 pages.

Lamba, H., "Understanding Semantic Segmentation with UNET," Towards Data Science (2019). https://towardsdatascience.com/understanding-semantic-segmentation-with-unet-6be4142d4b47, 23 pages.

Medisetty, S. et al., "Identification of Periodic Fish Tags With Deep Learning," The Journal of Ocean Technology, vol. 16(3), (2021). p 134-149.

Medisetty, S. K., "Identification of High-Frequency Periodic Acoustic Tags With Deep Learning," [Master's Thesis, Dalhousie University], (2021). https://dalspace.library.dal.ca/handle/10222/80629, 90 pages.

\* cited by examiner

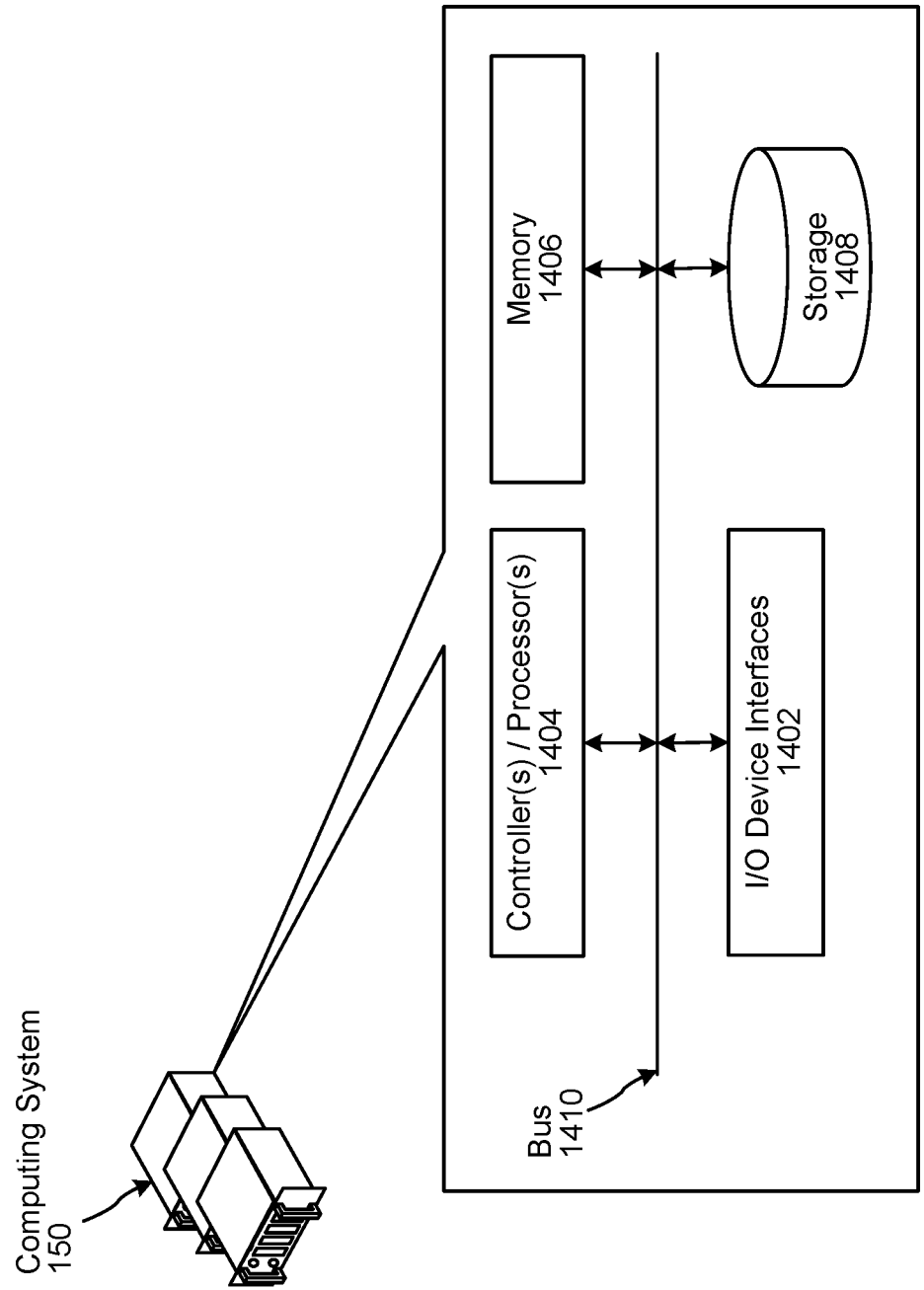

FINE-SCALE MOVEMENT TRACKING OF UNDERWATER OBJECTS

RELATED APPLICATIONS

The present application claims the benefit under 35 U.S.C. § 119 (e) to U.S. Provisional Application No. 63/305,720 filed Feb. 2, 2022 the contents of which is incorporated by reference herein in its entirety.

BACKGROUND

Acoustic telemetry is routinely employed to detect and quantify behaviors of aquatic animals. The ability to acoustically tag and release fish and other aquatic animals allows researchers to monitor their presence/absence and spatial movements.

One method of identifying individual acoustic transmitters, sometimes referred to as tags, utilizes rule-based software algorithms for automatically detecting period signal encoding acoustic transmitters at some minimal level of accuracy, and then using trained human analysts to further manually assign remaining acoustic signals to acoustic transmitters in order to increase overall detection accuracy to an appropriate level. The foregoing methodology has significant processing cost and time, and has a lack of scalability.

SUMMARY

The present disclosure provides techniques for performing fine-scale tracking of underwater objects. Said techniques are scalable for use with respect to a vast amount, e.g., millions, of period signal encoding acoustic transmitters.

An aspect of the present disclosure relates to at least one computing device for performing fine-scale movement tracking of underwater objects. The at least one computing device may be configured to receive first data including first timestamps corresponding to first acoustic signals detected using an underwater acoustic receiver, where the first acoustic signals propagate from one or more period-unique acoustic transmitters, and each of the one or more period-unique acoustic transmitters are implanted in or attached to a different underwater object. The at least one computing device may be configured to select a first period at which a first period-unique acoustic transmitter, of among a list of known period-unique acoustic transmitters, emits acoustic signals. The at least one computing device may be configured to generate first raw image data comprising first graphical elements representing the first timestamps, where the first raw image data has a first axis corresponding to linear time, and a second axis having a magnitude corresponding to the first period. The at least one computing device may further be configured to process, using a first machine learning (ML) model, the first raw image data to generate segmented image data comprising second graphical elements, where the second graphical elements are a subset of the first graphical elements determined by the first ML model to correspond to the first period. The at least one computing device may be configured to generate raw zoom image data corresponding to a portion of the segmented image data comprising the second graphical elements. The at least one computing device may be configured to process, using a second ML model, the raw zoom image data to generate segmented zoom image data comprising third graphical elements, where the third graphical elements are a subset of the second graphical elements determined by the second ML model to correspond to the first period. The at least one computing device may be configured to output second data indicating a portion, of the first timestamps, corresponding to the third graphical elements.

In some embodiments, the first ML model may generate a separate score for each graphical element in the segmented image data, the segmented image data may have the first axis (corresponding to linear time) and the second axis (having a magnitude corresponding to the first period), and the at least one computing device may be configured to identify the second graphical elements based on the second graphical elements being associated with scores that each satisfy a condition, and generate the raw zoom image data to include the first axis and the second axis zoomed in with respect to the second graphical elements. In some embodiments, the second ML model may generate a separate score for each graphical element in the segmented zoom image data, and the at least one computing device may be configured to identify the third graphical elements based on the third graphical elements being associated with scores that each satisfy a condition, and output the second data to indicate the portion, of the first timestamps, corresponding to the third graphical elements based on the third graphical elements being associated with the scores that each satisfy the condition. In some embodiments, the at least one computing device may be configured to select a timestamp of the first timestamps; determine time differences between the timestamp and other timestamps of the first timestamps; determine that at least one time difference, of the time differences, corresponds to an integer multiple of the first period; generate, based on determining that the at least one time difference corresponds to the integer multiple of the first period, period filter image data comprising a graphical element representing the timestamp; and process, using the first ML model, the period filter image data to generate the segmented image data. The period filter image data may have the first axis (corresponding to linear time) and the second axis (having a magnitude corresponding to the first period). In some embodiments, the at least one computing device may be configured to select a timestamp of the first timestamps; determine time differences between the timestamp and other timestamps of the first timestamps; determine that at least one time difference, of the time differences, corresponds to a subcode of the first period; generate, based on determining that the at least one time difference corresponds to the subcode, subcode filter image data comprising a graphical element representing the timestamp; and process, using the first ML model, the subcode filter image data to generate the segmented image data. In some embodiments, the at least one computing device may be configured to select a graphical element from among the second graphical elements represented in the segmented image data; determine time differences between the graphical element and other graphical elements of the second graphical elements; determine that at least one time difference, of the time differences, corresponds to an integer multiple of the first period; generate, based on determining that the at least one time difference corresponds to the integer multiple of the first period, period filter zoom image data comprising the graphical element; and process, using the second ML model, the period filter zoom image data to generate the segmented zoom image data. In some embodiments, the at least one computing device may be configured to select a graphical element from among the second graphical elements represented in the segmented image data; determine time differences between the graphical element and other graphical elements of the second graphical elements; determine that at least one time difference, of the time differences, corresponds to a subcode of the first period; generate, based on determining that the at least one time difference corresponds to the subcode, subcode filter zoom image data comprising the graphical element; and process, using the second ML model, the subcode filter zoom image data to generate the segmented zoom image data. In some embodiments, the at least one computing device may be configured to receive third data representing second timestamps corresponding to second acoustic signals emitted from a second period-unique acoustic transmitter at a second period, generate second raw image data comprising fourth graphical elements representing the second timestamps, generate third raw image data comprising fifth graphical elements corresponding to the fourth graphical elements offset by a value with respect to the second axis of the second raw image data, and generate the first ML model using the third raw image data. The second raw image data may have a first axis corresponding to linear time, and a second axis having a magnitude corresponding to the second period. In some embodiments, the at least one computing device may be configured to receive third data representing second timestamps corresponding to second acoustic signals emitted from a second period-unique acoustic transmitter; select a portion of the second timestamps; determine time differences between neighboring timestamps in the portion of the second timestamps; determine a sum of the time differences; generate at least a first timestamp by multiplying the sum of the time differences by v/c, wherein v is a speed representative of motion of an underwater object and c is the approximate speed of sound in water; generate third timestamps comprising the second timestamps and the first timestamp; and generate the second ML model based on the third timestamps. In some embodiments, at least one of the first ML model and the second ML model is a neural network.

Another aspect of the present disclosure relates to a computer-implemented method for performing fine-scale movement tracking of underwater objects. The computer-implemented method may comprise receiving first data including first timestamps corresponding to first acoustic signals detected using an underwater acoustic receiver, where the first acoustic signals propagate from one or more period-unique acoustic transmitters, and each of the one or more period-unique acoustic transmitters are implanted in or attached to a different underwater object. The computer-implemented method may further comprise selecting a first period at which a first period-unique acoustic transmitter, of among a list of known period-unique acoustic transmitters, emits acoustic signals. The computer-implemented method may further comprise generating first raw image data comprising first graphical elements representing the first timestamps, where the first raw image data has a first axis corresponding to linear time, and a second axis having a magnitude corresponding to the first period. The computer-implemented method may further comprise processing, using a first machine learning (ML) model, the first raw image data to generate segmented image data comprising second graphical elements, where the second graphical elements are a subset of the first graphical elements determined by the first ML model to correspond to the first period. The computer-implemented method may further comprise generating raw zoom image data corresponding to a portion of the segmented image data comprising the second graphical elements. The computer-implemented method may further comprise processing, using a second ML model, the raw zoom image data to generate segmented zoom image data comprising third graphical elements, where the third graphical elements are a subset of the second graphical elements determined by the second ML model to correspond to the first period. The computer-implemented method may further comprise outputting second data indicating a portion, of the first timestamps, corresponding to the third graphical elements.

In some embodiments, the first ML model may generate a separate score for each graphical element in the segmented image data, the segmented image data may have the first axis (corresponding to linear time) and the second axis (having a magnitude corresponding to the first period), and the computer-implemented method may further comprise identifying the second graphical elements based on the second graphical elements being associated with scores that each satisfy a condition, and generating the raw zoom image data to include the first axis and the second axis zoomed in with respect to the second graphical elements. In some embodiments, the second ML model may generate a separate score for each graphical element in the segmented zoom image data, and the computer-implemented method may further comprise identifying the third graphical elements based on the third graphical elements being associated with scores that each satisfy a condition, and outputting the second data to indicate the portion, of the first timestamps, corresponding to the third graphical elements based on the third graphical elements being associated with the scores that each satisfy the condition. In some embodiments, the computer-implemented method may further comprise selecting a timestamp of the first timestamps; determining time differences between the timestamp and other timestamps of the first timestamps; determining that at least one time difference, of the time differences, corresponds to an integer multiple of the first period; generating, based on determining that the at least one time difference corresponds to the integer multiple of the first period, period filter image data comprising a graphical element representing the timestamp; and processing, using the first ML model, the period filter image data to generate the segmented image data. The period filter image data may have the first axis (corresponding to linear time) and the second axis (having a magnitude corresponding to the first period). In some embodiments, the computer-implemented method may further comprise selecting a timestamp of the first timestamps; determining time differences between the timestamp and other timestamps of the first timestamps; determining that at least one time difference, of the time differences, corresponds to a subcode of the first period; generating, based on determining that the at least one time difference corresponds to the subcode, subcode filter image data comprising a graphical element representing the timestamp; and processing, using the first ML model, the subcode filter image data to generate the segmented image data. In some embodiments, the computer-implemented method may further comprise selecting a graphical element from among the second graphical elements represented in the segmented image data; determining time differences between the graphical element and other graphical elements of the second graphical elements; determining that at least one time difference, of the time differences, corresponds to an integer multiple of the first period; generating, based on determining that the at least one time difference corresponds to the integer multiple of the first period, period filter zoom image data comprising the graphical element; and processing, using the second ML model, the period filter zoom image data to generate the segmented zoom image data. In some embodiments, the computer-implemented method may further comprise selecting a graphical element from among the second graphical elements represented in the segmented image data; determining time differences between the graphical element and other graphical elements of the second graphical elements; determining that at least one time difference, of the time differences, corresponds to a subcode of the first period; generating, based on determining that the at least one time difference corresponds to the subcode, subcode filter zoom image data comprising the graphical element; and processing, using the second ML model, the subcode filter zoom image data to generate the segmented zoom image data. In some embodiments, the computer-implemented method further comprises receiving third data representing second timestamps corresponding to second acoustic signals emitted from a second period-unique acoustic transmitter at a second period, generating second raw image data comprising fourth graphical elements representing the second timestamps, generating third raw image data comprising fifth graphical elements corresponding to the fourth graphical elements offset by a value with respect to the second axis of the second raw image data, and generating the first ML model using the third raw image data. The second raw image data may have a first axis corresponding to linear time, and a second axis having a magnitude corresponding to the second period. In some embodiments, the computer-implemented method may further comprise receiving third data representing second timestamps corresponding to second acoustic signals emitted from a second period-unique acoustic transmitter; selecting a portion of the second timestamps; determining time differences between neighboring timestamps in the portion of the second timestamps; determining a sum of the time differences; generating at least a first timestamp by multiplying the sum of the time differences by v/c, wherein v is a speed representative of motion of an underwater object and c is the approximate speed of sound in water; generating third timestamps comprising the second timestamps and the first timestamp; and generating the second ML model based on the third timestamps. In some embodiments, at least one of the first ML model and the second ML model is a neural network.

A further aspect of the present disclosure relates to at least non-transitory computer-readable medium encoded within instructions that, when executed by at least one processor of at least one computing device, cause the at least one computing device to perform fine-scale movement tracking of underwater objects. The instructions, when executed, may cause the at least one computing device to receive first data including first timestamps corresponding to first acoustic signals detected using an underwater acoustic receiver, where the first acoustic signals propagate from one or more period-unique acoustic transmitters, and each of the one or more period-unique acoustic transmitters are implanted in or attached to a different underwater object. The instructions, when executed, may cause the at least one computing device to select a first period at which a first period-unique acoustic transmitter, of among a list of known period-unique acoustic transmitters, emits acoustic signals. The instructions, when executed, may cause the at least one computing device to generate first raw image data comprising first graphical elements representing the first timestamps, where the first raw image data has a first axis corresponding to linear time, and a second axis having a magnitude corresponding to the first period. The instructions, when executed, may cause the at least one computing device to process, using a first machine learning (ML) model, the first raw image data to generate segmented image data comprising second graphical elements, where the second graphical elements are a subset of the first graphical elements determined by the first ML model to correspond to the first period. The instructions, when executed, may cause the at least one computing device to generate raw zoom image data corresponding to a portion of the segmented image data comprising the second graphical elements. The instructions, when executed, may cause the at least one computing device to process, using a second ML model, the raw zoom image data to generate segmented zoom image data comprising third graphical elements, where the third graphical elements are a subset of the second graphical elements determined by the second ML model to correspond to the first period. The instructions, when executed, may cause the at least one computing device to output second data indicating a portion, of the first timestamps, corresponding to the third graphical elements.

In some embodiments, the first ML model may generate a separate score for each graphical element in the segmented image data, the segmented image data may have the first axis (corresponding to linear time) and the second axis (having a magnitude corresponding to the first period), and the instructions, when executed, may cause the at least one computing device to identify the second graphical elements based on the second graphical elements being associated with scores that each satisfy a condition, and generate the raw zoom image data to include the first axis and the second axis zoomed in with respect to the second graphical elements. In some embodiments, the second ML model may generate a separate score for each graphical element in the segmented zoom image data, and the instructions, when executed, may cause the at least one computing device to identify the third graphical elements based on the third graphical elements being associated with scores that each satisfy a condition, and output the second data to indicate the portion, of the first timestamps, corresponding to the third graphical elements based on the third graphical elements being associated with the scores that each satisfy the condition. In some embodiments, the instructions, when executed, may cause the at least one computing device to select a timestamp of the first timestamps; determine time differences between the timestamp and other timestamps of the first timestamps; determine that at least one time difference, of the time differences, corresponds to an integer multiple of the first period; generate, based on determining that the at least one time difference corresponds to the integer multiple of the first period, period filter image data comprising a graphical element representing the timestamp; and process, using the first ML model, the period filter image data to generate the segmented image data. The period filter image data may have the first axis (corresponding to linear time) and the second axis (having a magnitude corresponding to the first period). In some embodiments, the instructions, when executed, may cause the at least one computing device to select a timestamp of the first timestamps; determine time differences between the timestamp and other timestamps of the first timestamps; determine that at least one time difference, of the time differences, corresponds to a subcode of the first period; generate, based on determining that the at least one time difference corresponds to the subcode, subcode filter image data comprising a graphical element representing the timestamp; and process, using the first ML model, the subcode filter image data to generate the segmented image data. In some embodiments, the instructions, when executed, may cause the at least one computing device to select a graphical element from among the second graphical elements represented in the segmented image data; determine time differences between the graphical element and other graphical elements of the second graphical elements;

determine that at least one time difference, of the time differences, corresponds to an integer multiple of the first period; generate, based on determining that the at least one time difference corresponds to the integer multiple of the first period, period filter zoom image data comprising the graphical element; and process, using the second ML model, the period filter zoom image data to generate the segmented zoom image data. In some embodiments, the instructions, when executed, may cause the at least one computing device to select a graphical element from among the second graphical elements represented in the segmented image data; determine time differences between the graphical element and other graphical elements of the second graphical elements; determine that at least one time difference, of the time differences, corresponds to a subcode of the first period; generate, based on determining that the at least one time difference corresponds to the subcode, subcode filter zoom image data comprising the graphical element; and process, using the second ML model, the subcode filter zoom image data to generate the segmented zoom image data. In some embodiments, the instructions, when executed, may cause the at least one computing device to receive third data representing second timestamps corresponding to second acoustic signals emitted from a second period-unique acoustic transmitter at a second period, generate second raw image data comprising fourth graphical elements representing the second timestamps, generate third raw image data comprising fifth graphical elements corresponding to the fourth graphical elements offset by a value with respect to the second axis of the second raw image data, and generate the first ML model using the third raw image data. The second raw image data may have a first axis corresponding to linear time, and a second axis having a magnitude corresponding to the second period. In some embodiments, the instructions, when executed, may cause the at least one computing device to receive third data representing second timestamps corresponding to second acoustic signals emitted from a second period-unique acoustic transmitter; select a portion of the second timestamps; determine time differences between neighboring timestamps in the portion of the second timestamps; determine a sum of the time differences; generate at least a first timestamp by multiplying the sum of the time differences by v/c, wherein v is a speed representative of motion of an underwater object and c is the approximate speed of sound in water; generate third timestamps comprising the second timestamps and the first timestamp; and generate the second ML model based on the third timestamps. In some embodiments, at least one of the first ML model and the second ML model is a neural network.

BRIEF DESCRIPTION OF DRAWINGS

For a more complete understanding of the present disclosure, reference is now made to the following description taken in conjunction with the accompanying drawings.

FIG. 14 is a block diagram conceptually illustrating example components of a computing system, according to embodiments of the present disclosure.

DETAILED DESCRIPTION

Figure 1:
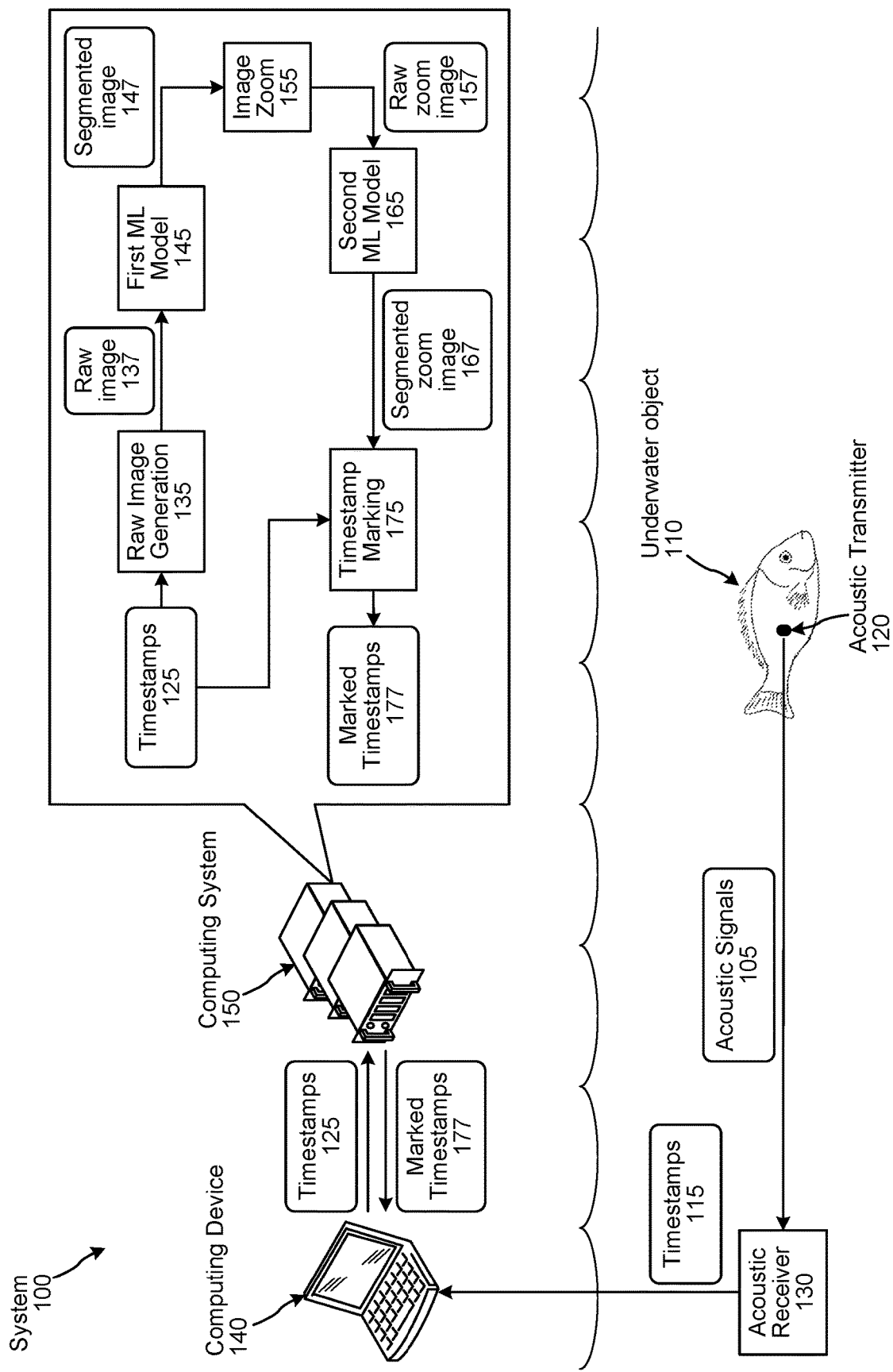
FIG. 1 is a conceptual diagram illustrating a system for fine-scale tracking of underwater objects, according to embodiments of the present disclosure.

The present disclosure provides at least one computing device, at least one computer-implemented method, and at least one non-transitory computer-readable medium for performing fine-scale tracking of underwater objects. In particular, teachings of the present disclosure may be used to perform fine-scale tracking of underwater objects having period signal encoding transmitter implanted therein or attached thereto.

A computing device or computing system may receive data including timestamps corresponding to acoustic signals detected using an underwater acoustic receiver, with the acoustic signals propagating from one or more period-unique acoustic transmitters, and each of the one or more period-unique acoustic transmitters being implanted in or attached to a different underwater object. The computing device or computing system may select a period of a known acoustic period-unique acoustic transmitters, and thereafter generate raw image data comprising first graphical elements representing the timestamps. The raw image data may have a first axis corresponding to linear time, and a second axis having a magnitude corresponding to the first period. The computing device or computing system may, using a first machine learning (ML) model, process the raw image data to generate segmented image data including second graphical elements, where the second graphical elements are a subset of the first graphical elements determined by the first ML model to correspond to the selected period. The computing device or computing system may generate raw zoom image data corresponding to a portion of the segmented image data including the second graphical elements. Thereafter, the computing device or computing system may, using a second ML model, process the raw zoom image data to generate segmented zoom image data including third graphical elements, where the third graphical elements are a subset of the second graphical elements determined by the second ML model to correspond to the selected period. The computing device or computing system may output or present data indicating a portion, of the timestamps, corresponding to the third graphical elements, to a user for performance of research or other tasks.

In some embodiments, the computing device or computing system may generate period filter image data and/or subcode filter image data using the timestamps; combine the raw image data, and the period filter image data and/or subcode filter image data, into stacked image data; and process the stacked image data using the aforementioned first ML model to generate the segmented image data. In at least some instances, the first ML model may exhibit increased accuracy when processing the stacked image data, as compared to processing just the raw image data.

In some embodiments, the computing device or computing system may generate period filter zoom image data and/or subcode filter zoom image data using the segmented image data; combine the raw image data, and the period filter zoom image data and/or subcode filter zoom image data, into stacked zoom image data; and process the stacked zoom image data using the aforementioned second ML model to generate the segmented image data. In at least some instances, the second ML model may exhibit increased accuracy when processing the stacked zoom image data, as compared to processing just the raw zoom image data.

Referring to FIG. 1, a system 100 for performing fine-scale tracking of underwater objects is described. As illustrated, the system 100 may include one or more underwater objects, collectively illustrated as an underwater object 110; one or more acoustic transmitters, collectively illustrated as an acoustic transmitter 120; one or more acoustic receivers, collectively illustrated as an acoustic receiver 130; a computing device 140; and a computing system 150.

While the underwater object 110 is illustrated as being a fish, the present disclosure is not limited thereto. The present disclosure envisions the underwater object 110 as being any underwater object whose motion is to be tracked. In some situations, the underwater object 110 may be an underwater animal, which may or may not be a mammal. For example, the underwater object 110 may be a fish, a reptile, a sea lion, a seal, a shark, an octopus, a whale, a dolphin, or other underwater animal. In some situations, the underwater object 110 may be a non-animal object such as, but not limited to, a submarine, an underwater drone, an underwater unexploded ordinance, etc.

The acoustic transmitter 120 may be implanted in or attached to the underwater object 110. The acoustic transmitter 120 may be a period signal encoding transmitter, sometimes referred to as a tag, that emits acoustic signals 105, sometimes referred to as "pings," at a constant rate, i.e., period, unique to the acoustic transmitter 120. As used herein, an "acoustic signal" refers to a sinusoidal acoustic wave of energy that is emitted from the acoustic transmitter 120 and propagates underwater (and optionally through air). In some embodiments, an acoustic signal may be about 1-2 milliseconds long. As the acoustic transmitter 120 may emit the acoustic signals 105 at a unique period, the acoustic transmitter 120 may be referred to as a period-unique acoustic transmitter. The identifier of the acoustic transmitter 120 is encoded in the period between the acoustic signals 105 emitted therefrom. Examples of period signal encoding transmitters are the HTI coded 795-Series Acoustic Tags sold by Innovasea Systems Inc.

The acoustic transmitter 120 may be configured to emit (individual) acoustic signals 105 at the period unique to the acoustic transmitter 120. For example and as illustrated in FIG. 2A, the acoustic transmitter 120 may emit a first acoustic signal 105a at a first time, and a second acoustic signal 105b at a second time, where the duration of time between the acoustic signals 105a/105b is the period unique to the acoustic transmitter 120.

In some embodiments, the acoustic transmitter 120 may be configured to emit groups of acoustic signals 105 at the period unique to the acoustic transmitter 120. The number of acoustic signals 105, emitted as a group by the acoustic transmitter 120, are configurable. For example and as illustrated in FIG. 2B, the acoustic transmitter 120 may emit acoustic signals 105 in groups of two. As illustrated in FIG. 2B, the acoustic transmitter 120 may emit a "primary" acoustic signal 105a and, thereafter as part of the same group, emit a "subcode" acoustic signal 105c. Thereafter, at the period unique to the acoustic transmitter 120, the acoustic transmitter 120 may again emit a primary acoustic signal 105b and a subcode acoustic signal 105d. For further example and as illustrated in FIG. 2C, the acoustic transmitter 120 may emit acoustic signals 105 in groups of three. As illustrated in FIG. 2C, the acoustic transmitter 120 may emit a primary acoustic signal 105a, thereafter emit a first subcode acoustic signal 105c, and thereafter emit a second subcode acoustic signal 105e. Thereafter, at the period unique to the acoustic transmitter 120, the acoustic transmitter 120 may again emit a primary acoustic signal 105b, a first subcode acoustic signal 105d, and a second subcode acoustic signal 105f. For example, a subcode acoustic signal may be emitted about 200 ms-700 ms after a preceding primary or subcode acoustic signal of the same acoustic signal group. As used herein, a "subcode" refers to a duration of time between emission of neighboring acoustic signals, e.g., a primary acoustic signal and a subcode acoustic signal, a first subcode acoustic signal and a second subcode acoustic signal, etc. in a group of acoustic signals.

Figure 2A:
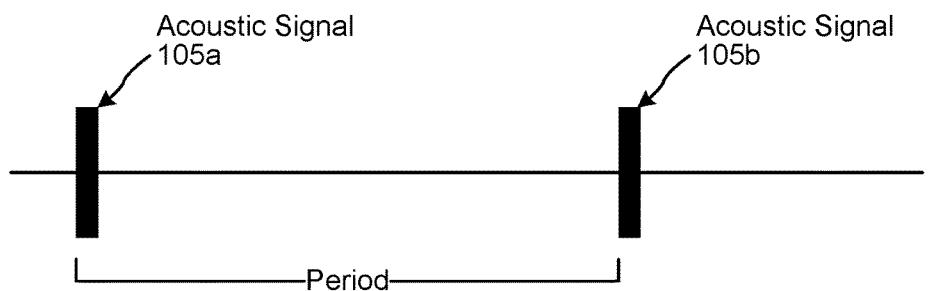
FIG. 2A is a conceptual diagram illustrating how an acoustic transmitter may emit single pulsed acoustic signals, according to embodiments of the present disclosure.
Figure 2B:
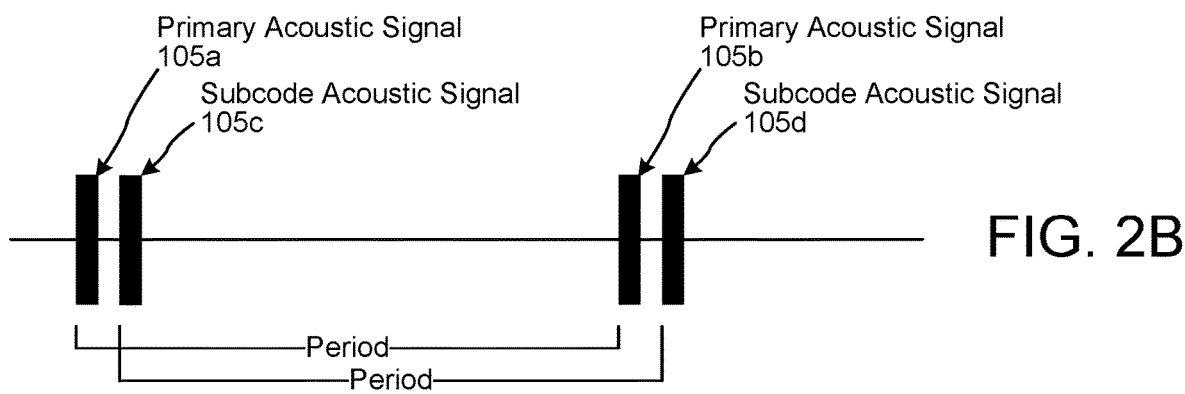
FIG. 2B is a conceptual diagram illustrating how an acoustic transmitter may emit double pulsed acoustic signals, according to embodiments of the present disclosure.
Figure 2C:
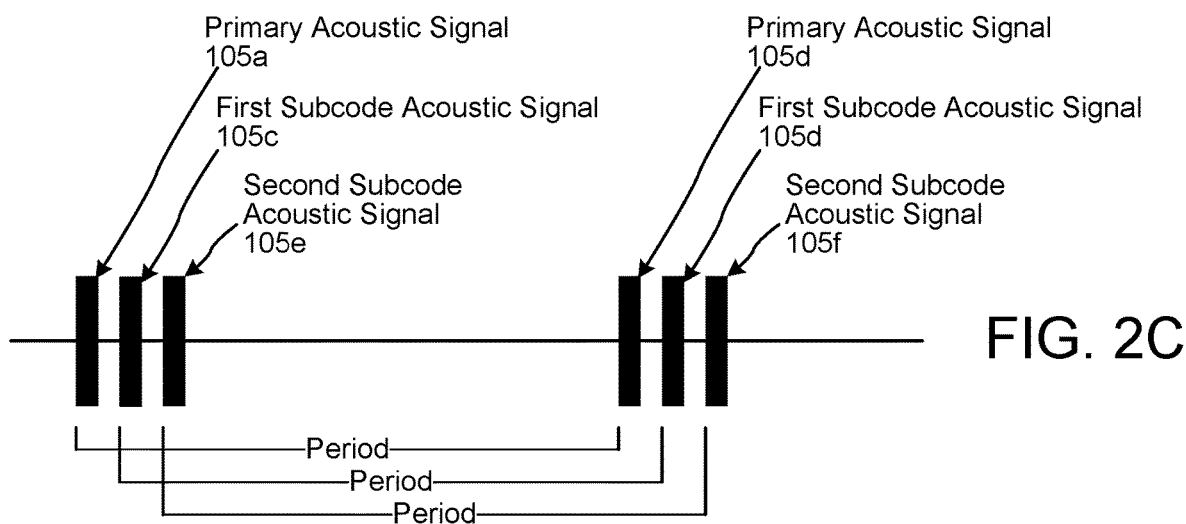
FIG. 2C is a conceptual diagram illustrating how an acoustic transmitter may emit triple pulsed acoustic signals, according to embodiments of the present disclosure.

One skilled in the art will appreciate that FIGS. 2A-2C are not limiting. That is, the acoustic transmitter 120 may emit acoustic signals 105 in groups of more than three without departing from the scope of the present disclosure. Moreover, it will be appreciated that the acoustic transmitter 120 may is not limited to emitting two instances/groups of acoustic signals 105 as illustrated in FIGS. 2A-2C, but rather may be configured to continuously emit instances/groups of acoustic signals 105 at the period unique to the acoustic transmitter 120 for as long as the acoustic transmitter 120 receives power from a power source, e.g., one or more internal batteries.

Various period unique acoustic transmitters may be implanted in or attached to underwater objects in an underwater environment, e.g., pond, lake, stream, river, etc. Each of the period unique acoustic transmitters may emit acoustic signals at the same frequency, yet each period unique acoustic transmitter may emit acoustic signals at a period unique from the other period unique acoustic transmitters in the underwater environment. For example, one period unique acoustic transmitter may emit an acoustic signal at 307 kHz at a period of once every 0.5 seconds, another period unique acoustic transmitter may emit an acoustic signal at 307 kHz at a period of once every 1 second, etc.

The teachings of the present disclosure enable fine-scale tracking of underwater objects based on each period unique acoustic transmitter emitting acoustic signals at a period unique from the periods at which other period unique acoustic transmitters emit acoustic signals.

The acoustic transmitter 120 may emit the acoustic signals 105 at any frequency that is detectable by the acoustic receiver 130. For example, in some embodiments the acoustic transmitter 120 may emit the acoustic signals 105 at 307 kHz.

Referring again to FIG. 1, the acoustic receiver 130 is a computing device that may be positioned underwater and configured to detect acoustic signals, including the acoustic signals 105, emitted from one or more acoustic transmitters, including the acoustic transmitter 120. In some embodiments, the acoustic receiver 130 may be positioned on a boat, or on land but within range of detecting the acoustic signals 105. The acoustic receiver 130 may include at least one processor, at least one storage, and at least one power source. In some embodiments, the power source may be one or more batteries. In some embodiments, the one or more batteries may be rechargeable.

The acoustic receiver 130 is configured to detect acoustic signals having a specific carrier frequency, or within a frequency range. For example, in some embodiments the acoustic receiver 130 may be configured to detect acoustic signals at a frequency of 307 kHz.

The acoustic receiver 130 may be configured with an internal clock enabling the acoustic receiver 130 to store a log of timestamps, where each timestamp represents a point in time when the acoustic receiver 130 detected an acoustic signal. Each time the acoustic receiver 130 detects an acoustic signal, the acoustic receiver 130 may update the log of timestamps to include a new timestamp corresponding to when the acoustic signal was detected.

The computing device 140 may receive, from the acoustic receiver 130, timestamps data 115 including timestamps stored by the acoustic receiver 130. In instances where only the underwater object 110 is within a detection range of the acoustic receiver 130, the timestamps data 115 may include timestamps all corresponding to acoustic signals 105 output by the acoustic transmitter 120. In instances where multiple underwater objects are within a detection range of the acoustic receiver 130, the timestamps data 115 may include timestamps corresponding to acoustic signals output by multiple acoustic transmitters implanted in or attached to multiple underwater objects.

While the computing device 140 is illustrated as a laptop, the present disclosure is not limited thereto. For example, the computing device 140 may be a laptop, a smart phone, a tablet, an Internet of Things (IoT) device, or some other device capable of performing the processing of the computing device 140 as described herein. For example, in some embodiments the computing device 140 may be a communications hub (placed on land) configured to receive the timestamps data 115 from the acoustic receiver 130 and send timestamps data 125 (described in detail herein below) to the computing system 150, e.g., via one or more cellular networks. As used herein, the computing system 150 is meant to cover a collection of two or more computing devices, e.g., servers, that operate together to perform the processing of the computing system 150 as described herein.

In some embodiments, the computing device 140 may receive the timestamps data 115, from the acoustic receiver 130, as a batch upload. For example, a user may couple the acoustic receiver 130 to the computing device 140, e.g., via a wire capable of connecting to a port of the acoustic receiver 130 and a port of the computing device 140; and thereafter download the timestamps data 115 from the acoustic receiver 130. For further example, in some embodiments, the computing device 140 may wirelessly, e.g., via Bluetooth, connect to the acoustic receiver 130 and wirelessly receive the timestamps data 115 as a batch of data from the acoustic receiver 130.

In some embodiments, the acoustic receiver 130 may be configured to send, to the computing device 140, timestamp data in near real-time of the acoustic receiver 130 detecting an acoustic signal and generating a corresponding timestamp. In other words, the acoustic receiver 130 may, wirelessly or in a wired manner, "stream" instances of timestamps data 115 to the computing device 140.

In some embodiments, the acoustic receiver 130 may continue to store timestamps after said timestamps have been communicated to the computing device 140. In other embodiments, the acoustic receiver 130 may delete timestamps that have been communicated to the computing device 140.

As illustrated in FIG. 1, the computing device 140 may send timestamps data 125 to the computing system 150. In embodiments where the computing device 140 receives the timestamps data 115 as a batch of data, e.g., in situations where the timestamps data 115 is downloaded to the computing device 140 by a user as described herein above, the timestamps data 125 may be the timestamps data 115. In embodiments where the computing device 140 receives the timestamps data 115 in near real-time of the acoustic receiver 130 generating same, the computing device 140 may be configured to periodically, e.g., once a minute, once every 15 minutes, once every 30 minutes, once every hour, once a day, etc., send the timestamps data 125 to the computing system 150. In such embodiments, the timestamps data 125 may correspond to only timestamps data 115 received by the computing device 140 since a last periodic sending of the timestamps data 125 to the computing system 150.

The computing device 140 may send the timestamps data 125 to the computing system 150 via one or more networks. The network(s) may include the Internet and/or any other wide- or local-area network, and may include wired, wireless, and/or cellular network hardware. In some embodiments, the computing system 150 may be configured as a cloud computing system.

The computing system 150 may include various components for performing fine-scale tracking of underwater objects. For example, the computing system 150 may include a raw image generation component 135, a first machine learning (ML) model 145, an image zoom component 155, a second ML model 165, and a timestamp marking component 175.

As detailed herein above, acoustic transmitters may emit acoustic signals at unique periods. The raw image generation component 135 is configured to generate raw image data for various acoustic transmitters, where an instance of raw image data is tuned to a period of a specific acoustic transmitter.

The raw image generation component 135 may include or communicate with a storage (not illustrated) of the computing system 150 that includes periods of known acoustic transmitters. In some embodiments, the storage may include periods of acoustic transmitters known to be within an underwater environment, i.e., a pond, lake, river, etc., that the acoustic receiver 130 is positioned within or positioned with respect to.

The raw image generation component 135 selects a period from among the periods stored in the storage. Using the selected period, the raw image generation component 135 processes the timestamps data 125 to generate raw image data 137. To generate raw image data 137 for the period, the raw image generation component 135 generates the raw image data 137 to have a first axis corresponding to linear time, and a second axis having a magnitude equal to the selected period. For example, if the selected period is 1 second, the raw image data 137 would include a first axis corresponding to linear time, and a second axis having a magnitude of 1 second. For further example, if the selected period is 50 milliseconds, the raw image data 137 would include a first axis corresponding to linear time, and a second axis having a magnitude of 50 milliseconds.

The raw image data 137 is not limited as to which axis needs to be linear time and which axis needs to be the selected period. In some embodiments, the x-axis may be linear time, and the y-axis may be the selected period. In other embodiments, the y-axis may be linear time, and the x-axis may be the selected period.

Configuring the axes of the raw image data 137 as such results in the raw image data 137 presenting timestamps, corresponding to acoustic signals emitted from an acoustic transmitter and detected by the acoustic receiver 130 at the selected period, as a continual line of graphical elements, e.g., dots, squares, plus signs, exes, etc., and all other timestamps, i.e., timestamps corresponding to acoustic signals emitted from one or more acoustic transmitters at one or more periods other than the selected period, as scattered graphical elements, e.g., dots, squares, plus signs, exes, etc. In the example of FIG. 2A, assuming the selected period corresponds to the period shown in FIG. 2A, the raw image data 137 may include scattered graphical elements (if acoustic signals output at one or more periods other than the selected period were detected by the acoustic receiver 130) and a single line of graphical elements corresponding to timestamps representing detection of the primary acoustic signals 105a/105b. In the example of FIG. 2B, assuming the selected period corresponds to the period shown in FIG. 2B, the raw image data 137 may include scattered graphical elements (if acoustic signals output at one or more periods other than the selected period were detected by the acoustic receiver 130), a first line of graphical elements corresponding to timestamps representing detection of the primary acoustic signals 105a/105b, and a second line of graphical elements corresponding to timestamps representing detection of the subcode acoustic signals 105c/105d. In the example of FIG. 2C, assuming the selected period corresponds to the period shown in FIG. 2C, the raw image data 137 may include scattered graphical elements (if acoustic signals output at one or more periods other than the selected period were detected by the acoustic receiver 130), a first line of graphical elements corresponding to timestamps representing detection of the primary acoustic signals 105a/105b, a second line of graphical elements corresponding to timestamps representing detection of the first subcode acoustic signals 105c/105e, and a third line of graphical elements corresponding to timestamps representing detection of the second subcode acoustic signals 105c/105f. In situations where the timestamps data 125 does not correspond to any acoustic signals output at the selected period, the raw image data 137 may include scattered graphical elements corresponding to the timestamps, without any lines of graphical elements as described above.

In some embodiments, a pixel, representing a timestamp of the timestamps data 125 in the raw image data 137, may be presented using a particular color, graphical user interface (GUI) element, e.g., dot, square, plus sign, the letter x, etc., and/or some other visual distinction as compared to pixels in the raw image data 137 not corresponding to timestamps in the timestamps data 125.

A graphical element, in a line of graphical elements corresponding to timestamps representing acoustic signals emitted at the selected period, may be positioned along the axis, tuned to the selected period, based on a position of the acoustic transmitter with respect to the acoustic receiver 130 when the acoustic signal, corresponding to the graphical element, was emitted. As such, one skilled in the art will appreciate that a line of graphical elements may not be limited to having a single slope, but rather may exhibit multiple slopes as the underwater objects position changes with respect to the acoustic receiver 130.

The distance between two lines of graphical elements, in the raw image data 137 along the axis tuned to the selected period, may correspond to a subcode of the acoustic transmitter 120. In other words, the distance between two lines of graphical elements, in the raw image data 137 along the axis tuned to the selected period, may correspond to a duration of time between acoustic signals, e.g., a duration of time between acoustic signals 105a/105c in FIG. 2B.

The raw image data 137, output by the raw image generation component 135, may be input to a first ML model 145. The first ML model 145 is configured to perform image segmentation processing, with respect to the raw image data 137, to generate segmented image data 147 including a subset of the graphical elements, corresponding to timestamps as represented in the raw image data 137, determined by the first ML model 145 to correspond to the selected period. In other words, the first ML model 145 may generate the segmented image data 147 to include the one or more lines of graphical elements represented in the raw image data 137 as representing timestamps corresponding to acoustic signals emitted at the selected period. Put another way, the first ML model 145 may generate the segmented image data 147 to be the raw image data 137 without the graphical elements corresponding to timestamps the first ML model 145 determines to be "scatter." As such, in addition to the raw image data 137, the second ML model 165 may receive and process (at runtime) the period selected by the raw image generation component 135 as detailed herein above. In at least some embodiments, the axes, of the segmented image data 147, may be the same as the axes of the raw image data 137.

In some embodiments, the first ML model 145 may generate a score, e.g., confidence score or probability score, for each graphical element in the raw image data 137, where a score represents a determination of the first ML model 145 that the graphical element represents a timestamp corresponding to an acoustic signal emitted at the period selected to generate the raw image data 137. In some embodiments, a score may be a numerical value, e.g., on a scale of 0 to 1. In some embodiments, a score may be a binned value, e.g., low, medium, or high. In some embodiments, the first ML model 145 may generate the segmented image data 147 to include graphical elements, representing timestamps, associated with scores satisfying, e.g., meeting or exceeding, a condition, e.g., a threshold numerical or binned score, depending on the circumstance.

In some embodiments, the first ML model 145 may generate a binary output, where a first, e.g. "yes," output indicates the first ML model 145 determined a graphical element corresponds to an acoustic signal emitted at the period selected to generate the raw image data 137, and a second, e.g., "no," output indicates the first ML model 145 determined a graphical element does not correspond to an acoustic signal emitted at the selected period. In such embodiments, the first ML model 145 may generate the segmented image data 147 to include only those graphical elements representing timestamps associated with the aforementioned first output.

The first ML model 145 may be trained using manually annotated raw image data, where each instance of training raw image data is manually annotated to indicate graphical elements representing timestamps corresponding to acoustic signals emitted at a period to which an axis of the training raw image data has been tuned. In other words, each instance of training raw image data may be manually annotated to indicate one or more lines of graphical elements representing timestamps corresponding to acoustic signals output at a period to which an axis of the training raw image data has been tuned. The first ML model 145 may be trained in a period-agnostic manner, meaning the training raw image data may not, in at least some embodiments, be annotated to indicate the period to which an axis of the training raw image data has been tuned.

The axis of the training raw image data, tuned to a particular period, is configurable. In other words, in some embodiments, the x-axis of training raw image data may be tuned to a particular period, and the y-axis may be linear time. In other embodiments, the x-axis of training raw image data may be linear time, and the y-axis may be tuned to a particular period. Notwithstanding, in at least some embodiments it may be beneficial for the axes of the training raw image data to be configured according to how the axes of the raw image data will be configured for input to the first ML model 145 at runtime. For example, if the raw image data 137 includes an x-axis corresponding to linear time and a y-axis having a magnitude tuned to a period, the training raw image data may be configured with an x-axis corresponding to linear time and a y-axis having a magnitude tuned to a period. Similarly and for further example, if the raw image data 137 includes a y-axis corresponding to linear time and an x-axis having a magnitude tuned to a period, the training raw image data may be configured with a y-axis corresponding to linear time and an x-axis having a magnitude tuned to a period.

In some embodiments, the axes of the segmented image data 147 may be the same as the axes of the raw image data 137. For example, if the raw image data 137 includes an x-axis having a magnitude of the period selected by the raw image generation component 135, and a y-axis corresponding to linear time, the segmented image data 147 may include an x-axis having a magnitude of the selected period, and a y-axis corresponding to linear time.

The first ML model 145 may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. In some embodiments, the first ML model 145 may be configured as a neural network. In some embodiments, the first ML model 145 may be configured as a UNET, i.e., a fully convolutional neural network configured to perform image segmentation processing.

Training of the first ML model 145 may require establishing a "ground truth" for the training raw image data examples. In machine learning, the term "ground truth" refers to the accuracy of a training set's classification for supervised learning techniques. Various techniques may be used to train the first ML model 145, including backpropagation, statistical learning, supervised learning, semi-supervised learning, stochastic learning, or other known techniques.

The segmented image data 147, output by the first ML model 145, may be input to an image zoom component 155. The image zoom component 155 is configured to process the segmented image data 147 to generate raw zoom image data 157 corresponding to a version of the segmented image data 147 zoomed in with respect to the line(s) of graphical elements presented therein. The image zoom component 155 may determine the raw zoom image data 157 to be a portion, of the segmented image data 147, only including the line(s) of graphical elements presented therein. As such, the raw zoom image data 157 may correspond to a higher resolution version of the segmented image data 147.

As described above, the first ML model 145 may generate a score for each graphical element in segmented image data 147. The image zoom component 155 may determine the graphical elements, in the segmented image data 147, associated with scores satisfying a condition, e.g., a threshold score. The image zoom component 155 may generate the raw zoom image data 157 to include the graphical elements, representing timestamps, having scores satisfying the condition, and having the axes of the segmented image data 147 but zoomed in with respect to the graphical elements associated with scores satisfying the condition. The linear time axis, of the raw zoom image data 157, may be the same as the linear time axis of the segmented image data 147. In other words, the resolution of the linear time axis may remain constant between the segmented image data 147 and the raw zoom image data 157. However, the resolution of the other axis, of the raw zoom image data 157, may be increased as compared to the axis of the segmented image data 147 tuned to the period of the acoustic transmitter of interest.

The raw zoom image data 157, output by the image zoom component 155, may be input to a second ML model 165. The second ML model 165 is configured to perform image segmentation processing, with respect to the raw zoom image data 157, to generate segmented zoom image data 167, where the segmented zoom image data 167 includes a subset of the graphical elements, corresponding to timestamps as represented in the raw zoom image data 157, determined by the second ML model 165 to correspond to the selected period. In other words, the second ML model 165 may generate the segmented zoom image data 167 to include a portion of the graphical elements, represented as one or more lines of graphical elements in the raw zoom image data 157, that the second ML model 165 determines correspond to acoustic signals emitted at the selected period.

Put another way, the second ML model 165 may generate the segmented zoom image data 167 by removing a portion of the graphical elements, representing timestamps in the raw zoom image data 157, that the second ML model 165 determines do not correspond to acoustic signals emitted at the selected period. As such, in addition to the raw zoom image data 157, the second ML model 165 may receive and process (at runtime) the period selected by the raw image generation component 135 as detailed herein above.

In some embodiments, the second ML model 165 may generate a score, e.g., confidence score or probability score, for each graphical element in the raw zoom image data 157, where a score represents a determination of the second ML model 165 that the graphical element represents a timestamp corresponding to an acoustic signal emitted at the period selected by the raw image generation component 135. In some embodiments, a score may be a numerical value, e.g., on a scale of 0 to 1. In some embodiments, a score may be a binned value, e.g., low, medium, or high. In some embodiments, the second ML model 165 may generate the segmented zoom image data 167 to include graphical elements associated with scores satisfying, e.g., meeting or exceeding, a condition, e.g., a threshold numerical or binned score, depending on the circumstance.

In some embodiments, the second ML model 165 may generate a binary output, where a first, e.g. "yes," output indicates the second ML model 165 determined a graphical element corresponds to an acoustic signal emitted at the period selected by the raw image generation component 135, and a second, e.g., "no," output indicates the second ML model 165 determined a graphical element does not correspond to an acoustic signal emitted at the selected period. In such embodiments, the second ML model 165 may generate the segmented zoom image data 167 to include only those graphical elements associated with the aforementioned first output.

The second ML model 165 may be trained using manually annotated zoom image data, where each instance of training zoom image data is manually annotated to indicate graphical elements representing timestamps corresponding to acoustic signals emitted at a period to which an axis of the training zoom image data has been tuned. In other words, each instance of training zoom image data may be manually annotated to indicate one or more lines of graphical elements representing timestamps corresponding to acoustic signals output at a period to which an axis of the training zoom image data has been tuned. In some embodiments, the training zoom image data may be generated using the first ML model 145. The second ML model 165 may be trained in a period-agnostic manner, meaning the training zoom image data may not, in at least some embodiments, be annotated to indicate the period to which an axis of the training zoom image data has been tuned.

The axis of the training zoom image data, tuned to a particular period, is configurable. In other words, in some embodiments, the x-axis of training zoom image data may be tuned to a particular period, and the y-axis may be linear time. In other embodiments, the x-axis of training zoom image data may be linear time, and the y-axis may be tuned to a particular period. Notwithstanding, in at least some embodiments it may be beneficial for the axes of the training zoom image data to be configured according to how the axes of the zoom image data will be configured for input to the second ML model 165 at runtime. For example, if the raw zoom image data 157 includes an x-axis corresponding to linear time and a y-axis having a magnitude tuned to a period, the training zoom image data may be configured with an x-axis corresponding to linear time and a y-axis having a magnitude tuned to a period. Similarly and for further example, if the raw zoom image data 157 includes a y-axis corresponding to linear time and an x-axis having a magnitude tuned to a period, the training zoom image data may be configured with a y-axis corresponding to linear time and an x-axis having a magnitude tuned to a period.

The second ML model 165 may be trained and operated according to various ML techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. In some embodiments, the second ML model 165 may be configured as a neural network. In some embodiments, the second ML model 165 may be configured as a UNET, i.e., a fully convolutional neural network configured to perform image segmentation processing.

Training of the second ML model 165 may require establishing a "ground truth" for the training zoom image data examples. Various techniques may be used to train the second ML model 165, including backpropagation, statistical learning, supervised learning, semi-supervised learning, stochastic learning, or other known techniques.

The segmented zoom image data 167, output by the second ML model 165, may be input to the timestamp marking component 175. The timestamp marking component 175 may also take as input the timestamps data 125. The timestamp marking component 175 is configured to generate marked timestamps data 177 including the timestamps, represented in the timestamps data 125, associated with periods corresponding to acoustic transmitters, i.e., associated with unique identifiers of the acoustic transmitters.

The timestamp marking component 175 may process the segmented zoom image data 167 to identify graphical elements, representing timestamps therein, associated with scores (as determined by the second ML model 165) satisfying a condition, e.g., a threshold score. The timestamp marking component 175 may thereafter associate, in the marked timestamps data 177, the timestamps, corresponding to the aforementioned graphical elements associated with scores satisfying a condition, with the period selected by the raw image generation component 135. As a result, said timestamps may be considered to be associated with the unique identifier of the acoustic transmitter that output the acoustic signals detected at the timestamps.

As described above, the timestamps data 125 may include timestamps corresponding to detected acoustic signals output by more than one acoustic transmitter. Consequently, the foregoing processing of the components of the computing system 150, with respect to the single selected period, may result in the timestamp marking component 175 only associating a portion of the timestamps, represented in the timestamps data 125, with the period.

In some embodiments, the timestamp marking component 175 may generate the marked timestamps data 177 to include only the aforementioned selected period and the timestamps determined to be associated therewith, and the computing system 150 may send said marked timestamps data to the computing device 140, where a user may via the data for research and/or other purposes.

In some embodiments, the timestamp marking component 175 may be configured to only output the marked timestamps data 177 when the marked timestamps data 177 includes all the timestamps, of the timestamps data 125, associated with respective periods. In such embodiments, the raw image generation component 135, the first ML model 145, the second ML model 165, and the timestamp marking component 175 may process, as described herein above, with respect to one or more additional periods until the timestamp marking component 175 has generated the marked timestamps data 177 to include all timestamps, of the timestamps data 125, associated with respective periods, at which point the computing system 150 may send said marked timestamps data 177 to the computing device 140.

As described above, the computing system 150 may include the raw image generation component, the first ML model 145, the second ML model 165, and the timestamp marking component 175. In some embodiments, the computing device 140 may implement the raw image generation component, the first ML model 145, the second ML model 165, and the timestamp marking component 175. In such embodiments, the computing device 140 may perform the processing of the computing device 140 and the computing system 150 described herein above. In other words, in such embodiments the computing system 150 may not be implemented, and all image processing and timestamp marking may be performed locally by the computing device 140.

Figure 3:
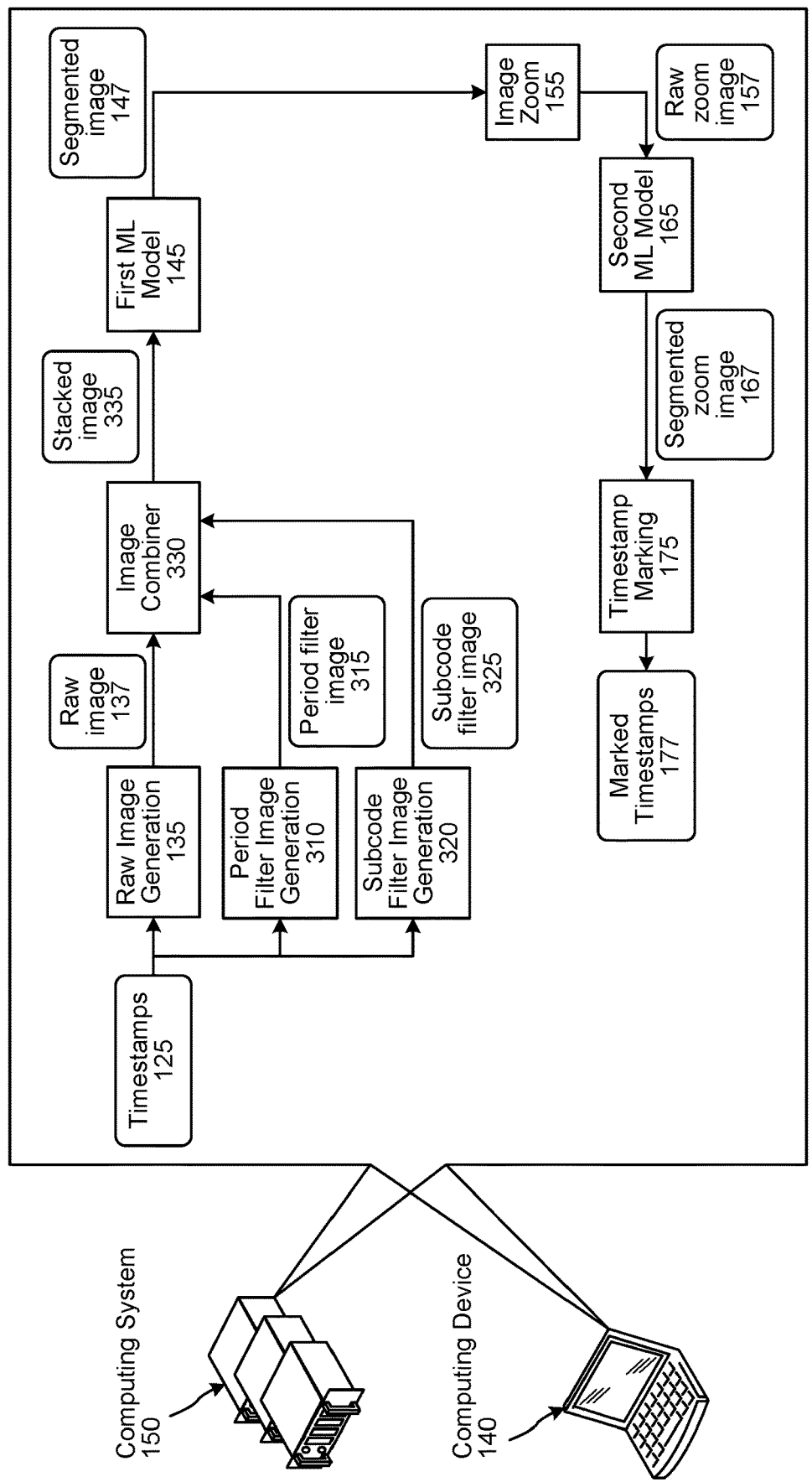
FIG. 3 is a conceptual diagram illustrating another example of how a computing device or computing system may be configured to perform fine-scale tracking of underwater objects, according to embodiments of the present disclosure.

Referring to FIG. 3, another example of how the computing device 140 or computing system 150 may be configured to perform fine-scale tracking of underwater objects is described. As illustrated in FIG. 3, in addition to the timestamps data 125 being input to the raw image generation component 135, the timestamps data 125 may be input to a period filter image generation component 310 and/or a subcode filter image generation component 320.

The period filter image generation component 310 is configured to generate period filter image data 315 including graphical elements filtered according to the period selected by the raw image generation component 135 to generate the raw image data 137. In generating the raw image data 137, resolution may be lost with respect to time. The period filtering performed by the period filter image generation component 310 enables resolution, e.g., milliseconds resolution, to be maintained.

Figure 4:
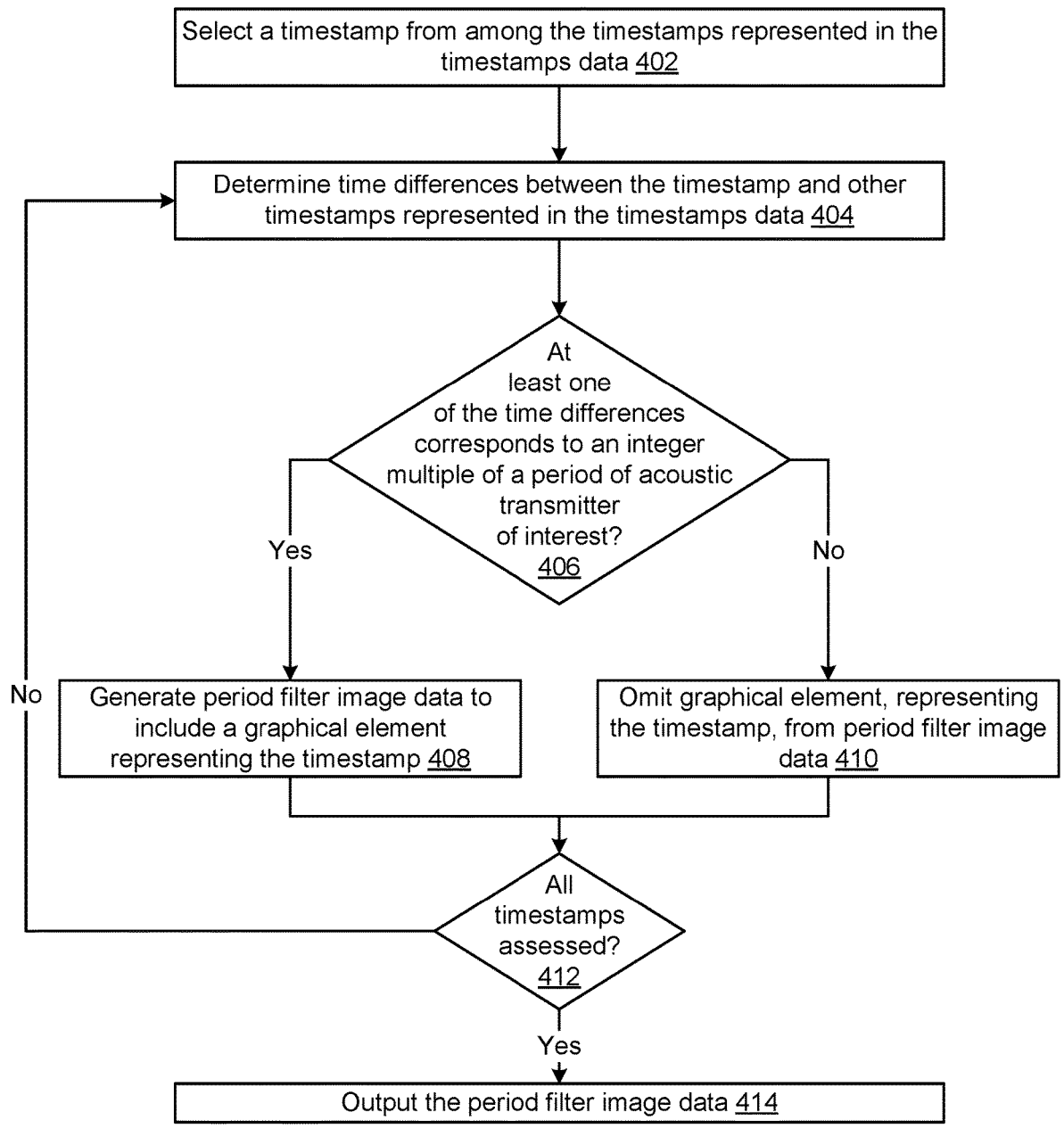
FIG. 4 is a process flow diagram illustrating processing that may be performed by a period filter image generation component, according to embodiments of the present disclosure.

The period filter image generation component 310 is configured to process the timestamps data 125 to determine, given a timestamp, whether neighboring timestamps were received at the period (within some tolerance) of the aforementioned timestamp. In some embodiments and with respect to FIG. 4, the period filter image generation component 310 may select (step 402) a timestamp from among the timestamps represented in the timestamps data 125, determine (step 404) time differences between the timestamp and other timestamps represented in the timestamps data 125, and determine (step 406) whether at least one of the time differences corresponds to an integer multiple of the period selected by the raw image generation component 135 to generate the raw image data 137.

If the period filter image generation component 310 determines at least one of the time differences corresponds to an integer multiple of the period, the period filter image generation component 310 may generate (step 408) the period filter image data 315 to include a graphical element representing the timestamp. The period filter image data 315 may be configured to include the same axes as the raw image data 137 as described above. As such, the graphical element may be plotted in the period filter image data 315 according to the timestamp it represents, one axis corresponding to linear time, and another axis having a magnitude corresponding to the period.

If the period filter image generation component 310 determines none of the time differences correspond to an integer multiple of the period, the period filter image generation component 310 may omit (step 410) a graphical element, representing the timestamp, from the period filter image data 315.

The period filter image generation component 310 may be configured to perform the processing described above with respect to FIG. 4 for each timestamp represented in the timestamps data 125. In such embodiments, after performing the processing of step 408 or 410 with respect to the timestamp, the period filter image generation component 310 may determine (step 412) whether all timestamps, represented in the timestamps data 125, have been assessed. If the period filter image generation component 310 determines not all timestamps have been assessed, the period filter image generation component 310 may continue processing, with respect to another timestamp in the timestamps data 125, at step 402. Conversely, if the period filter image generation component 310 determines all timestamps have been assessed, the period filter image generation component 310 may output (step 414) the period filter image data 315.

The subcode filter image generation component 320 is configured to generate subcode filter image data 325 including graphical elements filtered according to the subcode of the acoustic transmitter whose period the raw image generation component 135 selected to generate the raw image data 137. As discussed above, in generating the raw image data 137, resolution may be lost with respect to time. The subcode filtering performed by the subcode filter image generation component 320 enables resolution, e.g., milliseconds resolution, to be maintained.

Figure 5:
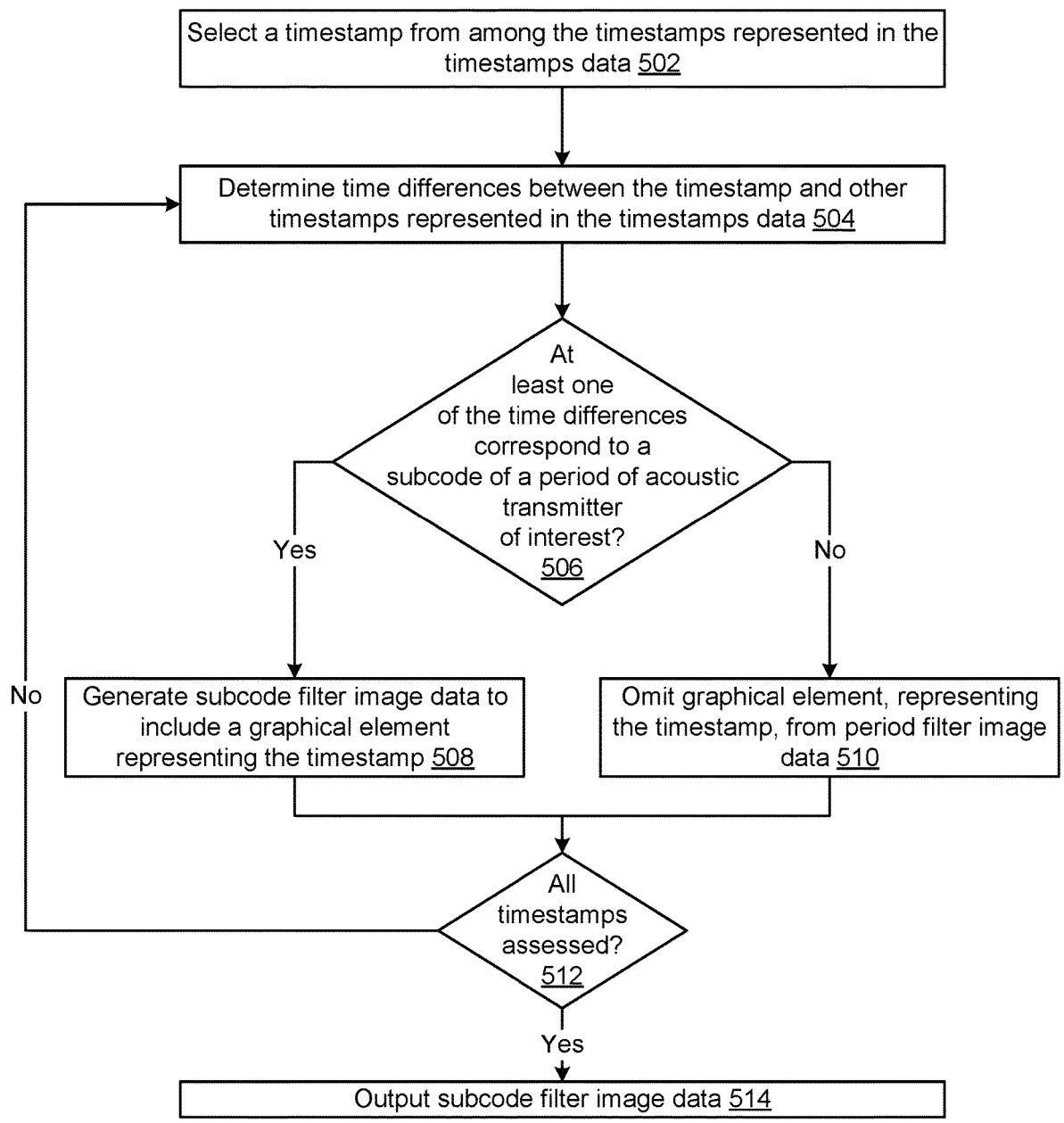
FIG. 5 is a process flow diagram illustrating processing that may be performed by a subcode filter image generation component, according to embodiments of the present disclosure.

The subcode filter image generation component 320 is configured to process the timestamps data 125 to determine, given a timestamp, whether neighboring timestamps were received at the subcode (within some tolerance) of the aforementioned timestamp. In some embodiments and with respect to FIG. 5, the subcode filter image generation component 320 may select (step 502) a timestamp from among the timestamps represented in the timestamps data 125, determine (step 504) time differences between the timestamp and other timestamps represented in the timestamps data 125, and determine (step 506) whether at least one of the time differences corresponds to a subcode of the acoustic transmitters whose period was selected by the raw image generation component 135 to generate the raw image data 137. As discussed above, a "subcode" refers to a duration of time between emission of neighboring acoustic signals, e.g., a primary acoustic signal and a subcode acoustic signal, a first subcode acoustic signal and a second subcode acoustic signal, etc. in a group of acoustic signals.

If the subcode filter image generation component 320 determines at least one of the time differences corresponds to the subcode, the subcode filter image generation component 320 may generate (step 508) the subcode filter image data 325 to include a graphical element representing the timestamp. The subcode filter image data 325 may be configured to include the same axes as the raw image data 137 as described above. As such, the graphical element may be plotted in the subcode filter image data 325 according to the timestamp it represents, one axis corresponding to linear time, and another axis having a magnitude corresponding to the period.

If the subcode filter image generation component 320 determines none of the time differences corresponds to the subcode, the subcode filter image generation component 320 may omit (step 510) a graphical element, representing the timestamp, from the subcode filter image data 325.

The subcode filter image generation component 320 may be configured to perform the processing described above with respect to FIG. 5 for each timestamp represented in the timestamps data 125. In such embodiments, after performing the processing of step 508 or 510 with respect to the timestamp, the subcode filter image generation component 320 may determine (step 512) whether all timestamps, represented in the timestamps data 125, have been assessed. If the subcode filter image generation component 320 determines not all timestamps have been assessed, the subcode filter image generation component 320 may continue processing, with respect to another timestamp in the timestamps data 125, at step 502. Conversely, if the subcode filter image generation component 320 determines all timestamps have been assessed, the subcode filter image generation component 320 may output (step 514) the subcode filter image data 325.

Referring again to FIG. 3, the computing device 140 or computing system 150 may include an image combiner component 330. The image combiner component 330 is configured to generate stacked image data 335 corresponding to a stacked representation of the raw image data 137, and the period filter image data 315 and/or the subcode filter image data 325, depending on whether the computing device 140 or computing system 150 is implementing the period filter image generation component 310 and/or the subcode filter image generation component 320. In some embodiments, the graphical elements, represented in the raw image data 137, may be of a different color and/or shape from the graphical elements represented in the period filter image data 315 and the subcode filter image data 325; the graphical elements, represented in the period filter image data 315, may be of a different color and/or shape from the graphical elements represented in the raw image data 137 and the subcode filter image data 325; and the graphical elements, represented in the subcode filter image data 325, may be of a different color and/or shape from the graphical elements represented in the raw image data 137 and the period filter image data 315.

The stacked image data 335 may be input to the first ML model 145, and the first ML model 145 may process the stacked image data 335 to generate the segmented image data 147 as described herein. In the example of FIG. 3, the segmented image data 147 may include graphical elements the first ML model 145 determines correspond to period and subcode timestamps of the acoustic transmitter of interest. In other words, the first ML model 145 may determine, for each graphical element, a score, e.g., a confidence score or probability score, representing a determination of the first ML model 145 that the graphical element corresponds to the period or subcode of the acoustic transmitter of interest.

As further illustrated in FIG. 3, the computing device 140 or the computing system 150 may include the second ML model 165 and the timestamp marking component 175 configured to process as described herein above with respect to FIG. 1 to generate the marked timestamps data 177.

Figure 6:
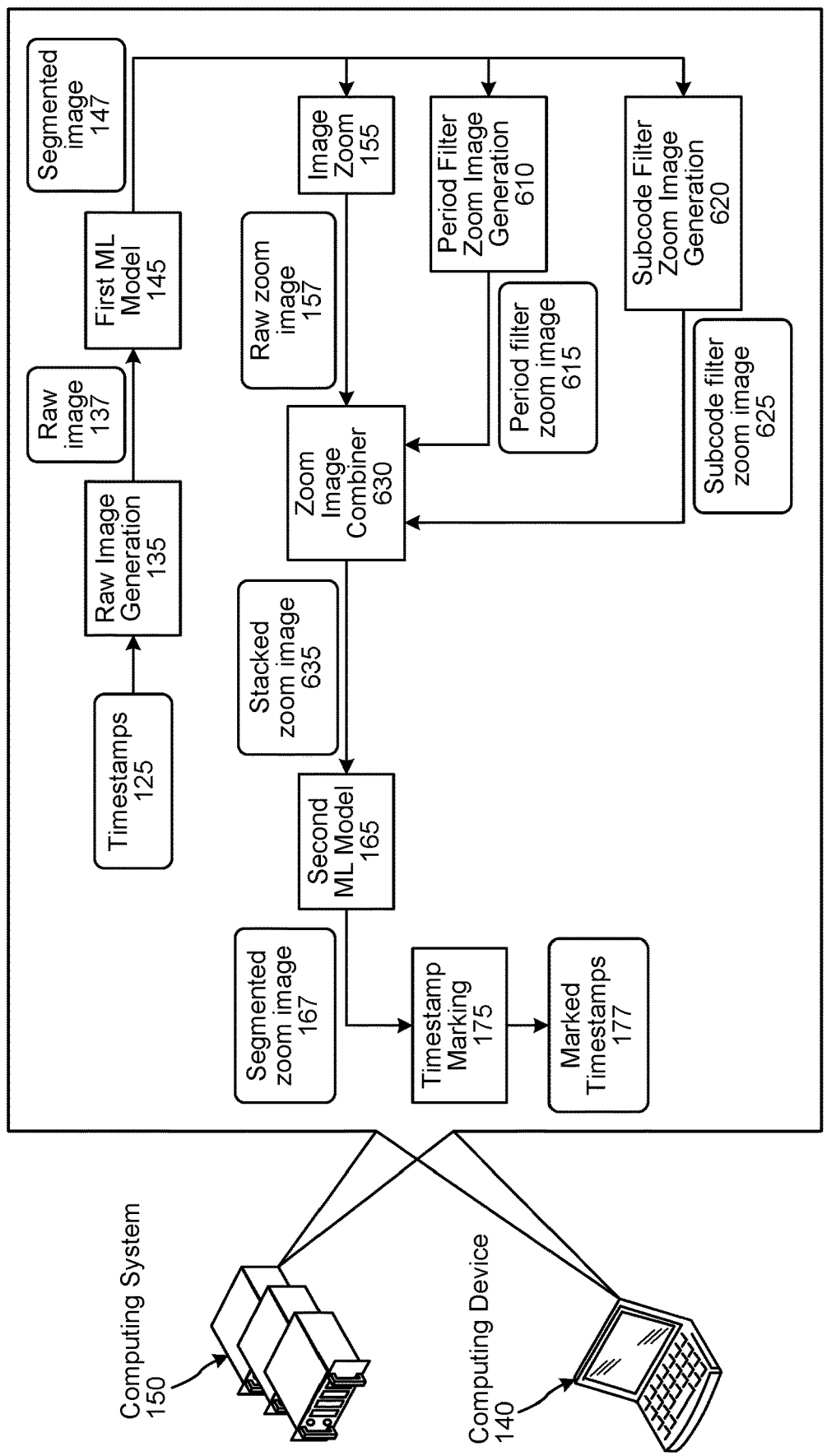
FIG. 6 is a conceptual diagram illustrating another example of how a computing device or computing system may be configured to perform fine-scale tracking of underwater objects, according to embodiments of the present disclosure.

Referring to FIG. 6, another example of how the computing device 140 or computing system 150 may be configured to perform fine-scale tracking of underwater objects is described. As illustrated in FIG. 6, in addition to the segmented image data 147 being input to the image zoom component 155, the segmented image data 147 may be input to a period filter zoom image generation component 610 and/or a subcode filter zoom image generation component 620.

The period filter zoom image generation component 610 is configured to generate period filter zoom image data 615 including graphical elements filtered according to the period selected by the raw image generation component 135 to generate the raw image data 137, and consequently the segmented image data 147.

Figure 7:
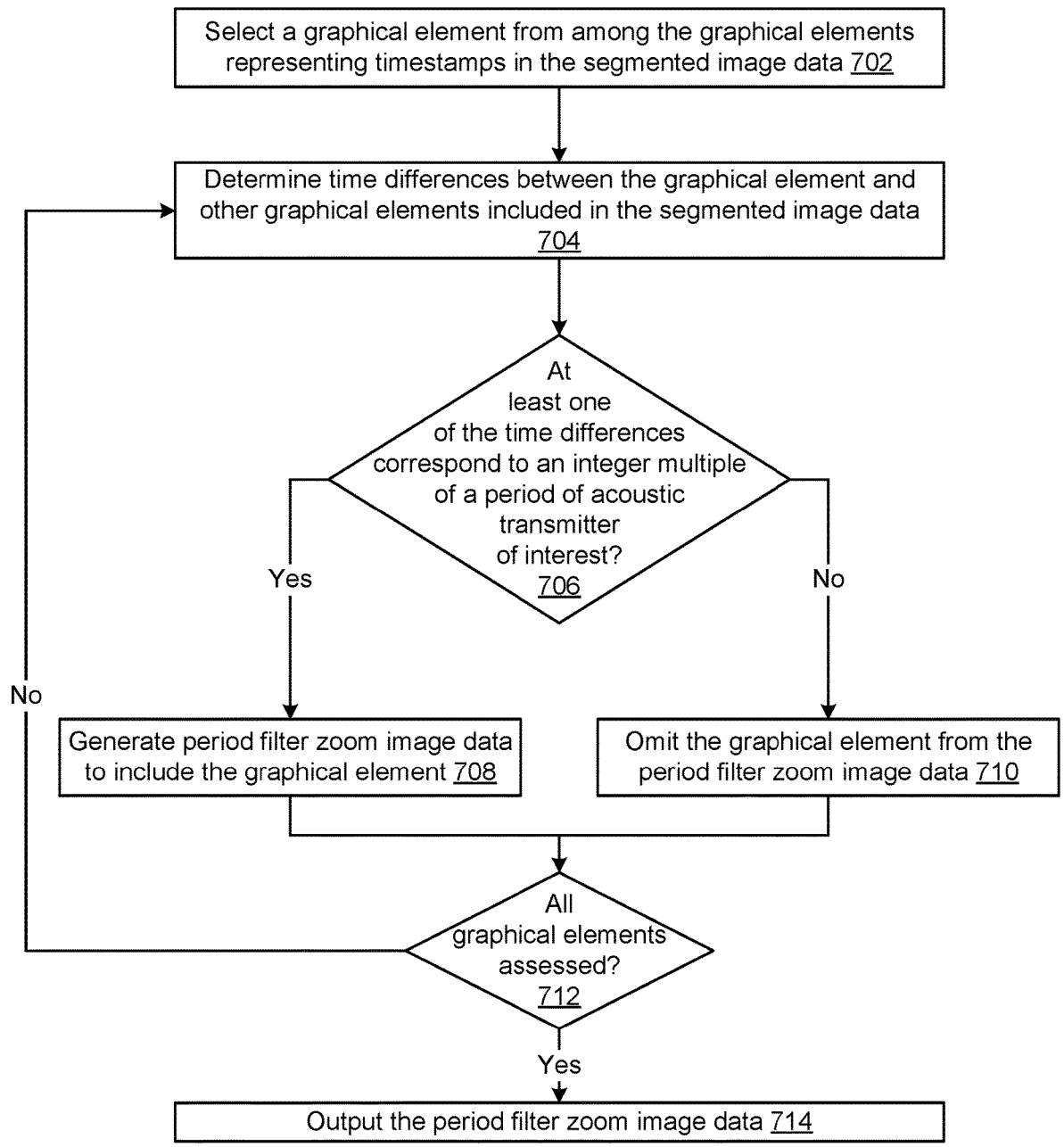
FIG. 7 is a process flow diagram illustrating processing that may be performed by a period filter zoom image generation component, according to embodiments of the present disclosure.

The period filter zoom image generation component 610 is configured to process the segmented image data 147 to determine, given a graphical element representing a timestamp, whether neighboring graphical elements, representing neighboring timestamps, were received at the period (within some tolerance) with respect to the aforementioned timestamp. In some embodiments and with respect to FIG. 7, the period filter zoom image generation component 610 may select (step 702) a graphical element from among the graphical elements representing timestamps in the segmented image data 147. The period filter zoom image generation component 610 may determine (step 704) time differences, i.e., using the linear time axis in the segmented image data 147, between the graphical element and other graphical elements included in the segmented image data 147.

The period filter zoom image generation component 610 may thereafter determine (step 706) whether at least one of the time differences corresponds to an integer multiple of the period selected by the raw image generation component 135 to generate the raw image data 137, and consequently the segmented image data 147. If the period filter zoom image generation component 610 determines at least one of the time differences corresponds to an integer multiple of the period, the period filter zoom image generation component 610 may generate (step 708) the period filter zoom image data 615 to include the graphical element selected at step 702. The period filter zoom image data 615 may be configured to include the same axes as the segmented image data 147 and the raw zoom image data 157 as described above with respect to FIG. 1.

If the period filter zoom image generation component 610 determines none of the time differences correspond to an integer multiple of the period, the period filter zoom image generation component 610 may omit (step 710) the graphical element, selected at step 702, from the period filter zoom image data 615.

The period filter zoom image generation component 610 may be configured to perform the processing described above with respect to FIG. 7 for each graphical element representing a timestamp in the segmented image data 147. In such embodiments, after performing the processing of step 708 or 710, the period filter zoom image generation component 610 may determine (step 712) whether all graphical elements, representing timestamps in the segmented image data 147, have been assessed. If the period filter zoom image generation component 610 determines not all graphical elements have been assessed, the period filter zoom image generation component 610 may continue processing, with respect to another graphical element, at step 702. Conversely, if the period filter zoom image generation component 610 determines all graphical elements have been assessed, the period filter zoom image generation component 610 may output (step 714) the period filter zoom image data 615.

The subcode filter zoom image generation component 620 is configured to generate subcode filter zoom image data 625 including graphical elements filtered according to the subcode of the acoustic transmitter whose period the raw image generation component 135 selected to generate the raw image data 137, and which was consequently used to generate the segmented image data 147.

Figure 8:
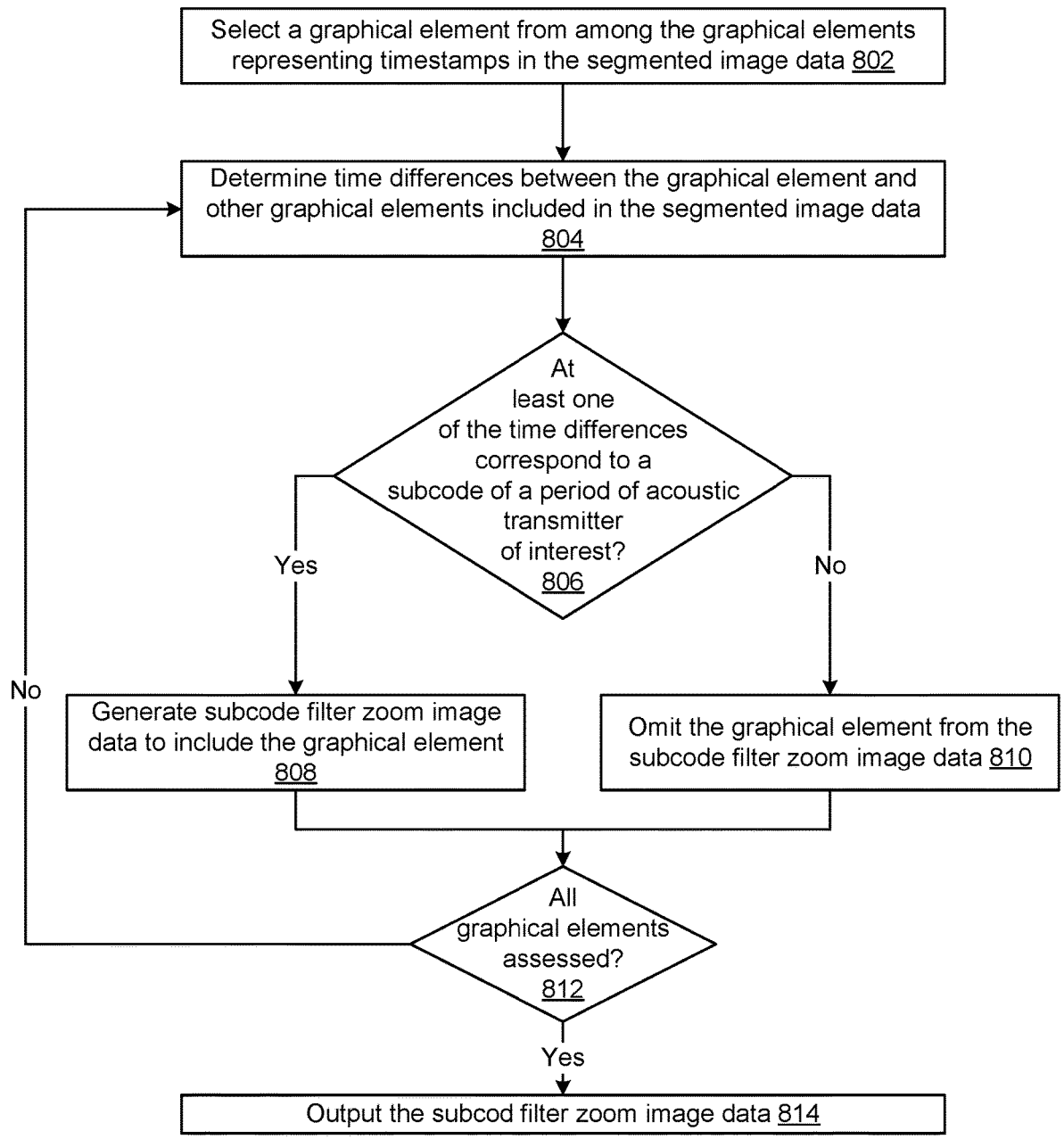
FIG. 8 is a process flow diagram illustrating processing that may be performed by a subcode filter zoom image generation component, according to embodiments of the present disclosure.

The subcode filter zoom image generation component 620 is configured to process the segmented image data 147 to determine, given a graphical element representing a timestamp, whether neighboring graphical elements, representing neighboring timestamps, were received at the subcode (within some tolerance) with respect to the aforementioned timestamp. In some embodiments and with respect to FIG. 8, the subcode filter zoom image generation component 620 may select (step 802) a graphical element from among the graphical elements representing timestamps in the segmented image data 147. The subcode filter zoom image generation component 620 may determine (step 804) time differences, i.e., using the linear time axis in the segmented image data 147, between the graphical element and other graphical elements included in the segmented image data 147.

The subcode filter zoom image generation component 620 may thereafter determine (step 806) whether at least one of the time differences corresponds to a subcode of the acoustic transmitters whose period was selected by the raw image generation component 135 to generate the raw image data 137, and which was consequently used to generate the segmented image data 147. As discussed above, a "subcode" refers to a duration of time between emission of neighboring acoustic signals, e.g., a primary acoustic signal and a subcode acoustic signal, a first subcode acoustic signal and a second subcode acoustic signal, etc. in a group of acoustic signals.

If the subcode filter zoom image generation component 620 determines at least one of the time differences corresponds to the subcode, the subcode filter zoom image generation component 620 may generate (step 808) the subcode filter zoom image data 625 to include the graphical element selected at step 802. The subcode filter zoom image data 625 may be configured to include the same axes as the segmented image data 147 and the raw zoom image data 157 as described above with respect to FIG. 1.

If the subcode filter zoom image generation component 620 determines none of the time differences correspond to the subcode, the subcode filter zoom image generation component 620 may omit (step 810) the graphical element from the subcode filter zoom image data 625.

The subcode filter zoom image generation component 620 may be configured to perform the processing described above with respect to FIG. 8 for each graphical element representing a timestamp in the segmented image data 147. In such embodiments, after performing the processing of step 808 or 810, the subcode filter zoom image generation component 620 may determine (step 812) whether all graphical elements, representing timestamps in the segmented image data 147, have been assessed. If the subcode filter zoom image generation component 620 determines not all graphical elements have been assessed, the subcode filter zoom image generation component 620 may continue processing, with respect to another graphical element, at step 802. Conversely, if the subcode filter zoom image generation component 620 determines all graphical elements have been assessed, the subcode filter zoom image generation component 620 may output (step 814) the subcode filter zoom image data 625.

Referring again to FIG. 6, the computing device 140 or computing system 150 may include a zoom image combiner component 630. The zoom image combiner component 630 is configured to generate stacked zoom image data 635 corresponding to a stacked representation of the raw zoom image data 157, and the period filter zoom image data 615 and/or the subcode filter zoom image data 625, depending on whether the computing device 140 or computing system 150 is implementing the period filter zoom image generation component 610 and/or the subcode filter zoom image generation component 620. In some embodiments, the graphical elements, represented in the raw zoom image data 157, may be of a different color and/or shape from the graphical elements represented in the period filter zoom image data 615 and the subcode filter zoom image data 625; the graphical elements, represented in the period filter zoom image data 615, may be of a different color and/or shape from the graphical elements represented in the raw zoom image data 157 and the subcode filter zoom image data 625; and the graphical elements, represented in the subcode filter zoom image data 625, may be of a different color and/or shape from the graphical elements represented in the raw zoom image data 157 and the period filter zoom image data 615.

The stacked zoom image data 635 may be input to the second ML model 165, and the second ML model 165 may process the stacked zoom image data 635 to generate the segmented zoom image data 167 as described herein. In the example of FIG. 6, the segmented zoom image data 167 may include graphical elements the second ML model 165 determines correspond to period and subcode timestamps of the acoustic transmitter of interest. In other words, the second ML model 165 may determine, for each graphical element, a score, e.g., a confidence score or probability score, representing a determination of the second ML model 165 that the graphical element corresponds to the period or subcode of the acoustic transmitter of interest.

As further illustrated in FIG. 6, the computing device 140 or the computing system 150 may include the timestamp marking component 175 configured to process as described herein above with respect to FIG. 1 to generate the marked timestamps data 177.

Figure 9:
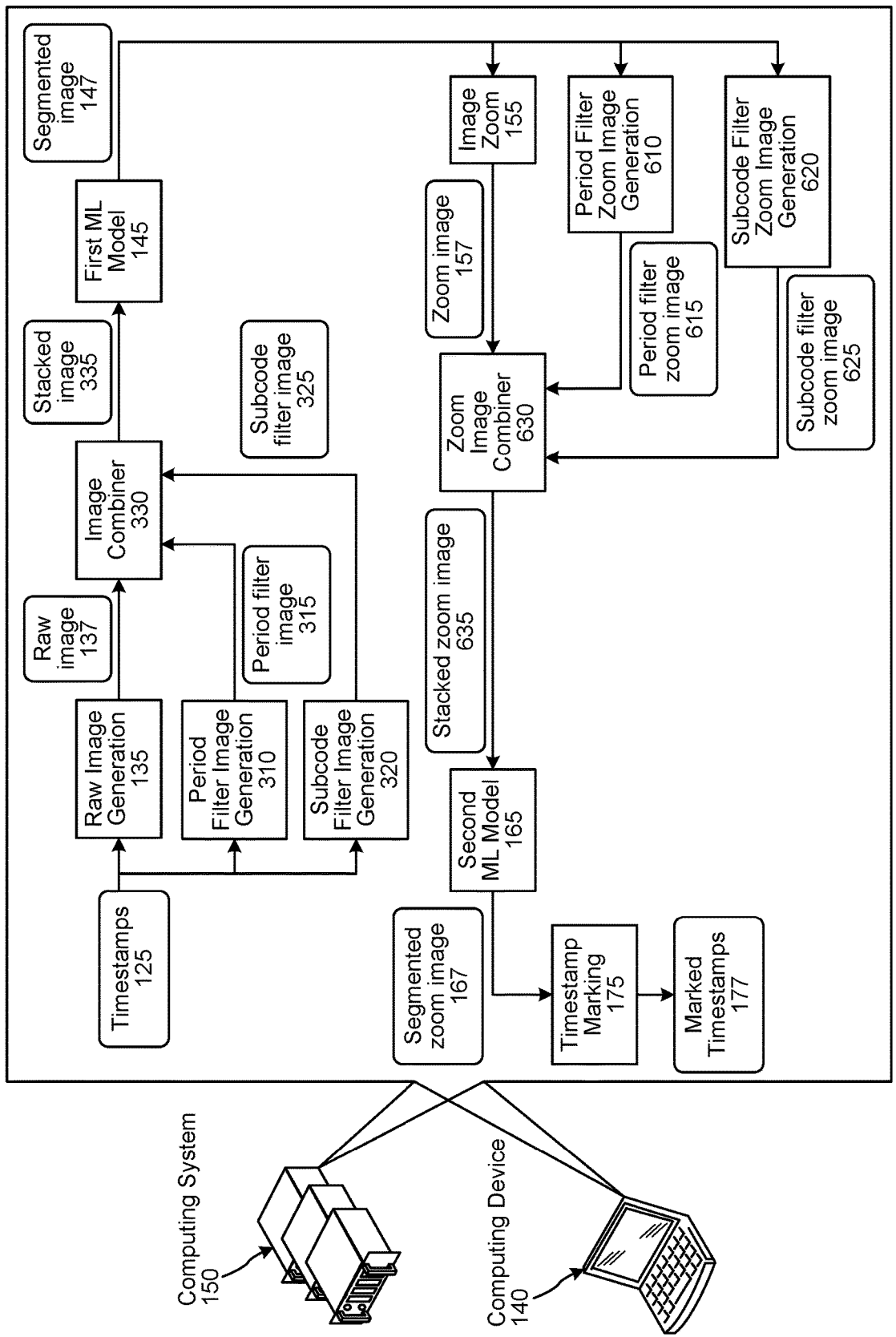
FIG. 9 is a conceptual diagram illustrating another example of how a computing device or computing system may be configured to perform fine-scale tracking of underwater objects, according to embodiments of the present disclosure.

Referring to FIG. 9, another example of how the computing device 140 or computing system 150 may be configured to perform fine-scale tracking of underwater objects is described. As illustrated in FIG. 9, the computing device 140 or the computing system 150 may include one or both of the period filter image generation component 310 and the subcode filter image generation component 320, and one or both of the period filter zoom image generation component 610 and the subcode filter zoom image generation component 620. In some embodiments, the configuration of the computing device 140 or computing system 150 of FIG. 9 may result in increased accuracy of timestamp marking, performed by the timestamp marking component 175, as compared the configurations of the computing device 140 or the computing system 150 of FIGS. 3 and 6.

Figure 10:
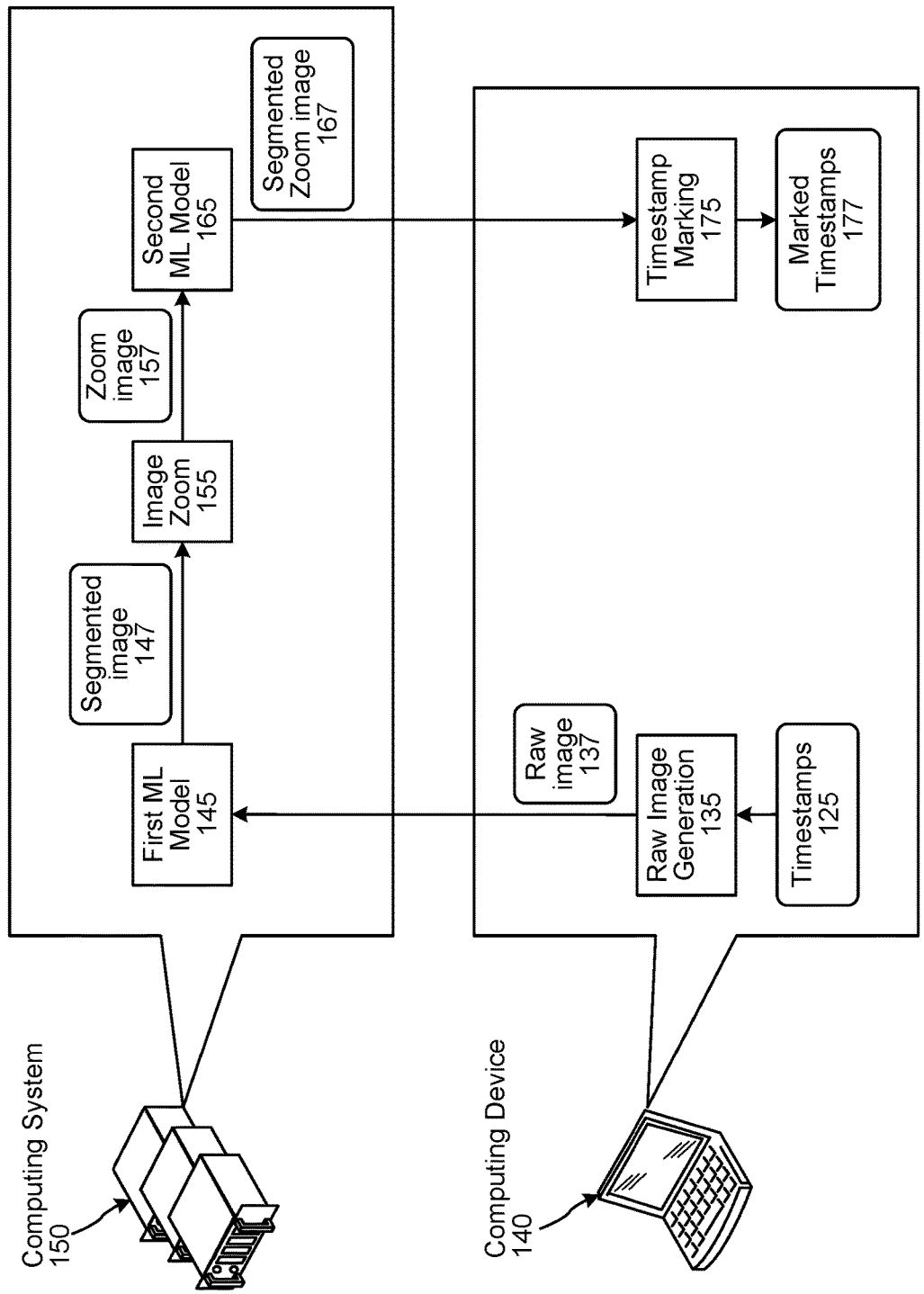
FIG. 10 is a conceptual diagram illustrating a distributed processing configuration of a computing device and a computing system to perform fine-scale tracking of underwater objects, according to embodiments of the present disclosure.

Referring to FIG. 10, an example of a distributed processing configuration of the computing device 140 and the computing system 150 is described. In some embodiments, it may be beneficial to configure the computing device 140 to perform some processing while configuring the computing system 150 to perform other processing, e.g., more resource intensive processing involving ML models. For example and as illustrated in FIG. 10, the computing device 140 may implement the raw image generation component 135 and the timestamp marking component 175, and the computing system 150 may implement the first ML model 145, the image zoom component 155, and the second ML model 165. While not illustrated in FIG. 10, in some embodiments, the computing device 140 may further implement the image combiner component 330, one or both of the period filter image generation component 310 and the subcode filter image generation component 320. Moreover, while not illustrated in FIG. 10, the computing system 150 may further implement the zoom image combiner component 630, and one or both of the period filter zoom image generation component 610 and the subcode filter zoom image generation component 620.

In some embodiments, one or more data augmentation processes may be performed with respect to the training data of the first ML model 145 and/or the training data of the second ML model 165 in order to generate a more robust and better performing ML model. In some embodiments, at least one of the one or more data augmentation processes, performed with respect to the training data of the first ML model 145, may be different from at least one of the one or more data augmentation processes performed with respect to the training data of the second ML model 165. In other embodiments, the one or more data augmentation processes, performed with respect to the training data of the first ML model 145, may be the same as the one or more data augmentation processes performed with respect to the training data of the second ML model 165.

Figure 11:
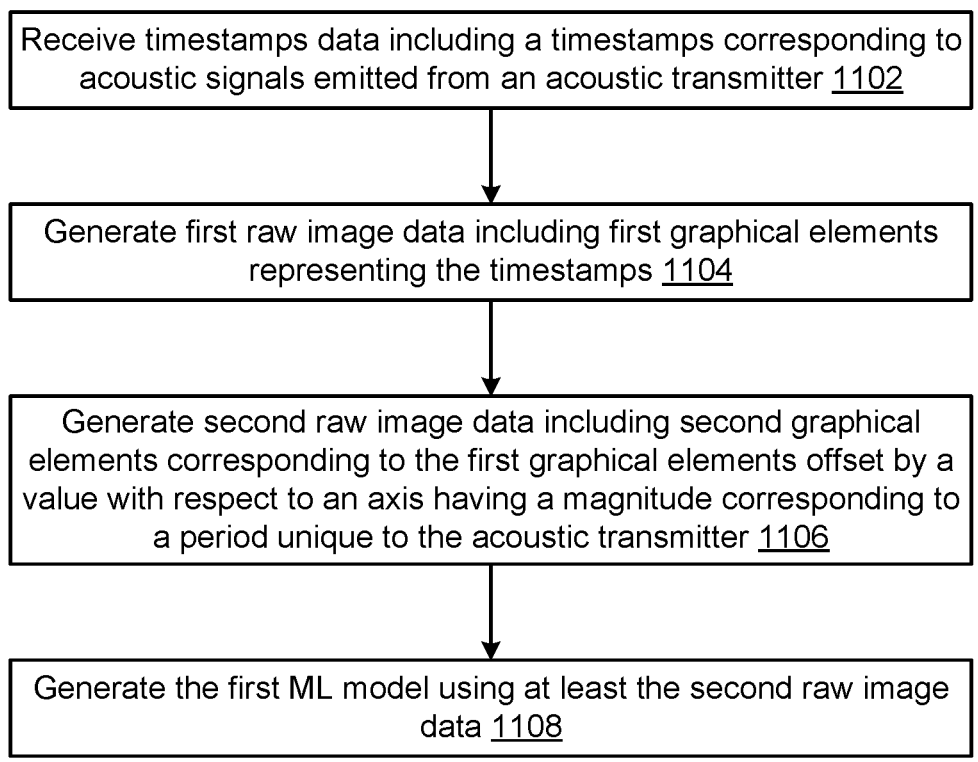
FIG. 11 is a process flow diagram illustrating how noise augmentation processing may be performed with respect to training data of a machine learning (ML) model, according to embodiments of the present disclosure.

Referring to FIG. 11, a process for performing noise augmentation of training data is described. The process includes receiving (step 1102) timestamps data including timestamps corresponding to acoustic signals emitted from an acoustic transmitter at a period unique to the acoustic transmitter. The process further includes generating (step 1104) first raw image data including first graphical elements representing the timestamps. The first raw image data has a first axis corresponding to linear time, and a second axis having a magnitude corresponding to the aforementioned period unique to the acoustic transmitter. The process next includes generating (step 1106) second raw image data including second graphical elements corresponding to the first graphical elements offset by a value with respect to the axis having the magnitude corresponding to the period unique to the acoustic transmitter. The process then includes generating (step 1108), i.e., training, the first ML model 145 using at least the second raw image data. For example, in some embodiments the aforementioned first raw image data may also be used to train the first ML model 145.

One skilled in the art will appreciate that the process of FIG. 11 may be adapted to generate training data for the second ML model 165. For example, such a process may include receiving first segmented image data including first graphical elements representing the timestamps, with the first segmented image data having a first axis corresponding to linear time, and a second axis having a magnitude corresponding to a period unique to an acoustic transmitter of interest; generating second segmented image data including second graphical elements corresponding to the first graphical elements offset by a value with respect to the axis having the magnitude corresponding to the period unique to the acoustic transmitter; and training the second ML model 165 using at least the second segmented image data (for example, in some embodiments the aforementioned first segmented image data may also be used to train the second ML model 165).

Figure 12:
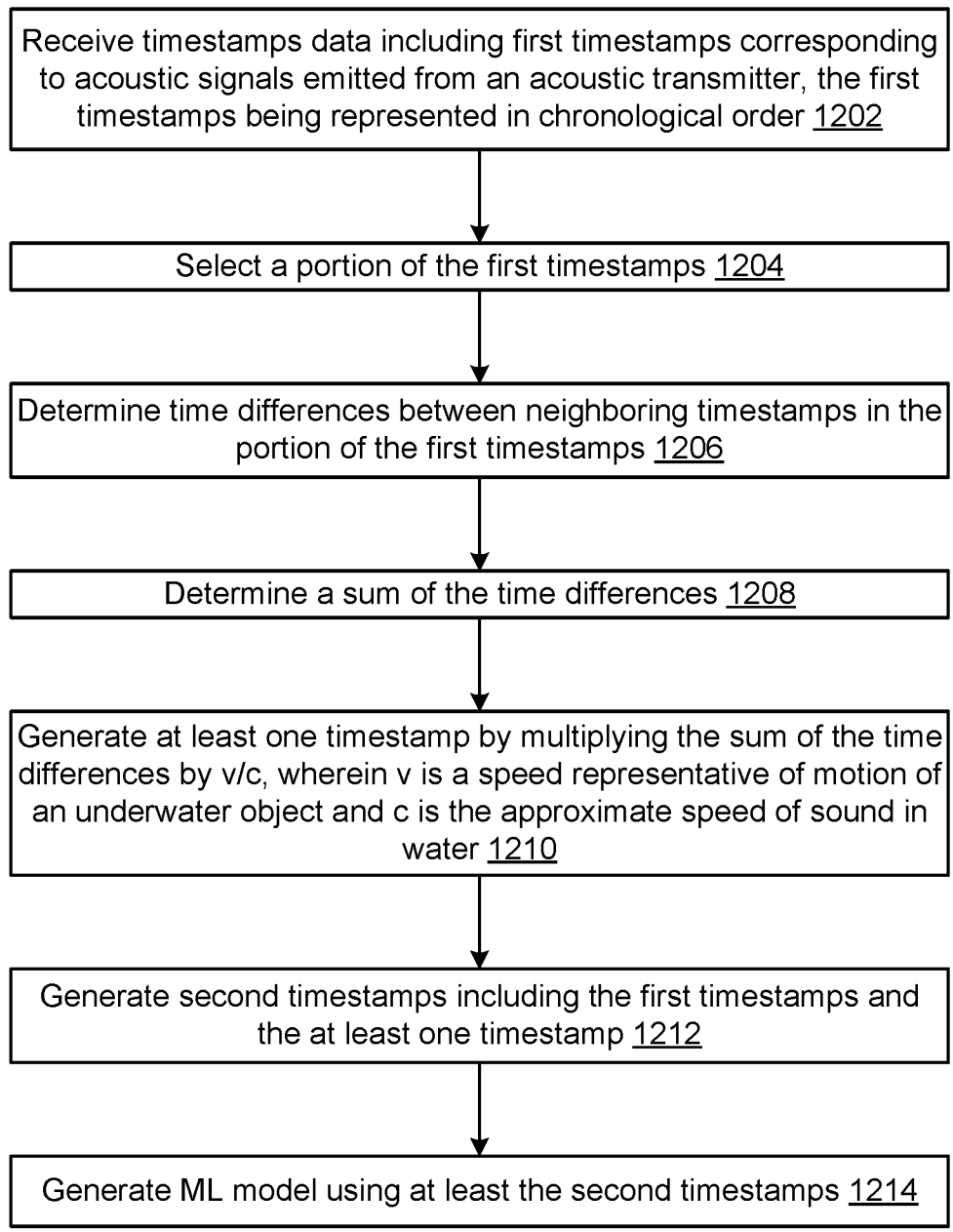
FIG. 12 is a process flow diagram illustrating how acoustic transmitter motion augmentation processing may be performed with respect to training data of a ML model, according to embodiments of the present disclosure.

Referring to FIG. 12, a process for performing acoustic transmitter motion augmentation of training data is described. The process includes receiving (step 1202) timestamps data including first timestamps corresponding to acoustic signals emitted from an acoustic transmitter, where the first timestamps are represented in chronological order according to linear time. The process further includes selecting (step 1204) a portion of the first timestamps. In at least some embodiments, the process may include randomly selecting the portion of the first timestamps. The magnitude of the portion of the first timestamps is configurable. The process also includes determining (step 1206) time differences between neighboring timestamps in the portion of the first timestamps; and determining (step 1208) a sum of the time differences. The process additionally includes generating (step 1210) a at least one timestamp by multiplying the sum of the time differences by v/c, where v is a speed representative of motion of an underwater object, and c is the approximate speed of sound in water, i.e., about 1,480 meters per second. Example speeds, representative of motion of an underwater object, include, but are not limited to, 0 to 2 m/s (e.g., for a fish) and 0.25 m/s to 0.5 m/s (e.g., for an autonomous underwater vehicle (AUV) or glider). The process further includes generation (step 1212) second timestamps including the first timestamps and the foregoing at least one timestamp.

The process further includes generating (step 1214), i.e., training, at least one ML model using at least the second timestamps. For example, the second timestamps may be used to generate raw image data, and the raw image data may be used to train the first ML model 145 as described herein above. For further example, the first ML model 145 may process the foregoing raw image data to generate segmented image data, and this segmented image data may be used to train the second ML model 165 as described herein above.

Figure 13:
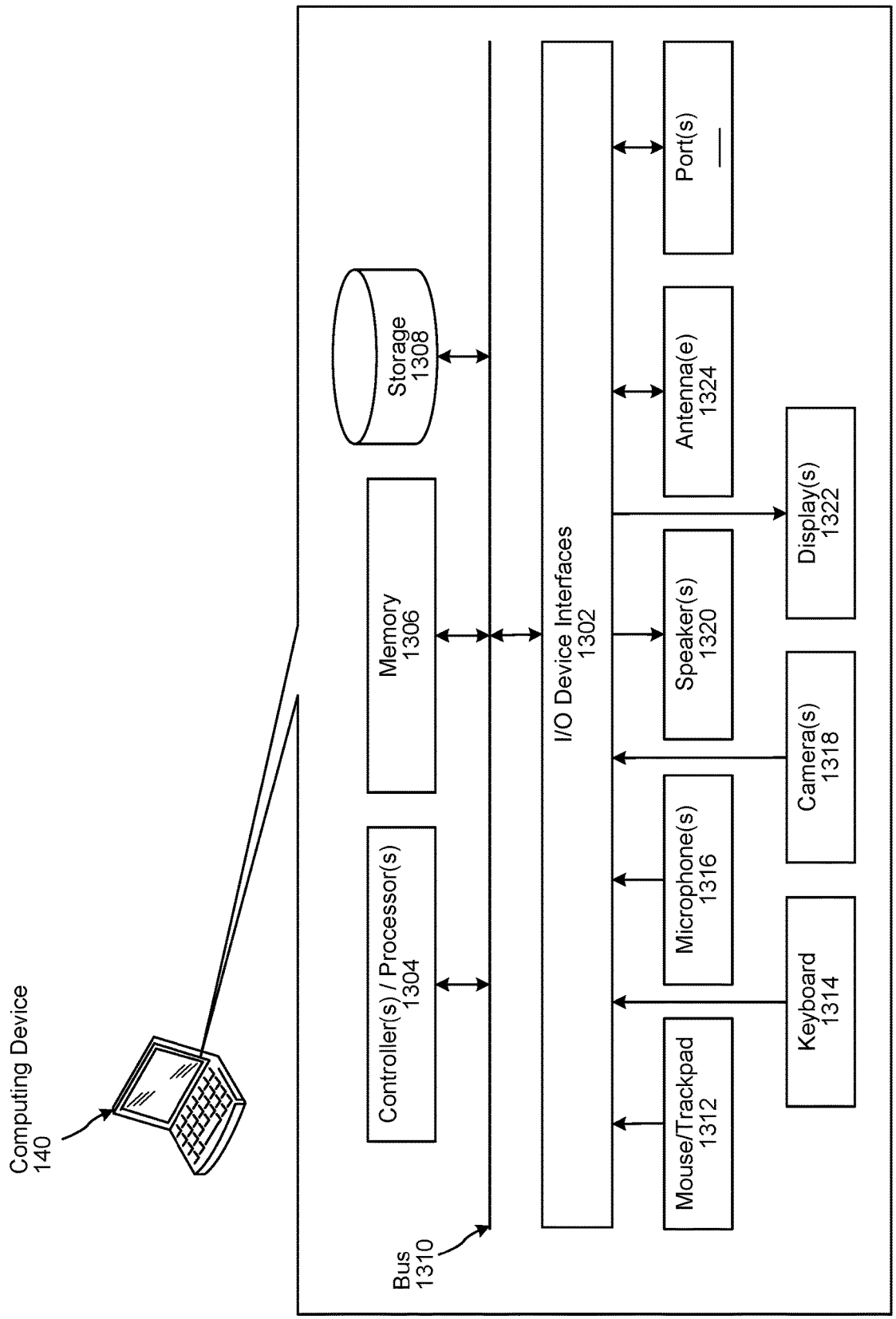
FIG. 13 is a block diagram conceptually illustrating example components of a computing device, according to embodiments of the present disclosure.

FIG. 13 is a block diagram conceptually illustrating example components of the computing device 140. FIG. 14 is a block diagram conceptually illustrating example components of the computing system 150. The computing system 150 may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The computing system 150 may be configured to operate using one or more of a client-server model, a computer bureau model, grid computing techniques, fog computing techniques, mainframe techniques, utility computing techniques, a peer-to-peer model, sandbox techniques, or other computing techniques.

Each of the computing device 140 and the computing system 150 may include one or more controllers/processors (1304/1404), which may each include a central processing unit (CPU) for processing data and computer-readable instructions, and a memory (1306/1406) for storing data and instructions. The memories (1306/1406) may individually include volatile random access memory (RAM), non-volatile read only memory (ROM), non-volatile magnetoresistive memory (MRAM), and/or other types of memory. Each of the computing device 140 and the computing system 150 may also include a data storage component (1308/1408) for storing data and controller/processor-executable instructions. Each data storage component (1308/1408) may individually include one or more non-volatile storage types such as magnetic storage, optical storage, solid-state storage, etc. Each of the computing device 140 and the computing system 150 may also be connected to removable or external non-volatile memory and/or storage (such as a removable memory card, memory key drive, networked storage, etc.) through respective input/output device interfaces (1302/1402).

Computer instructions for operating each of the computing device 140 and the computing system 150 and its various components may be executed by the respective device's controller(s)/processor(s) (1304/1404), using the memory (1306/1406) as temporary "working" storage at runtime. A device's computer instructions may be stored in a non-transitory manner in non-volatile memory (1306/1406), storage (1308/1408), or an external device(s). Alternatively, some or all of the executable instructions may be embedded in hardware or firmware on the respective device in addition to or instead of software.

Each of the computing device 140 and the computing system 150 includes input/output device interfaces (1302/1402). A variety of components may be connected through the input/output device interfaces (1302/1402), as will be discussed further below. Additionally, each of the computing device 140 and the computing system 150 may include an address/data bus (1310/1410) for conveying data among components of the respective device. Each component within the computing device 140 or the computing system 150 may also be directly connected to other components in addition to (or instead of) being connected to other components across the bus (1310/1410).

Referring to FIG. 13, the computing device 140 may include input/output device interfaces 1302 that connect to a variety of components such as, but not limited to, a mouse and/or trackpad 1312, a keyboard 1314, one or more microphones 1316, one or more cameras 1318, one or more speakers 1320, one or more displays 1322, one or more antennae 1324 (for connecting to one or more networks), and one or more ports 1326 for connecting the computing device 140 to an external device via a wire.

Via the one or more antennae XXV14, the input/output device interfaces 1302 may connect to one or more networks via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. The input/output device interfaces (1302/1402) may also include communication components that allow data to be exchanged between devices, such as different physical servers in a collection of servers or other components.

The components of the computing device 140 and/or the computing system 150 may include their own dedicated processors, memory, and/or storage. Alternatively, one or more of the components of the computing device 140 and/or the computing system 150 may utilize the input/output interfaces (1302/1402), processor(s) (1304/1404), memory (1306/1406), and/or storage (1308/1408) of the computing device 140 or the computing system 150, respectively.

As noted above, multiple devices may be employed in the computing system 150. In such a multi-device system, each of the devices may include different components for performing different aspects of the system's processing. The multiple devices may include overlapping components.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent, to one skilled in the art, that the disclosure may be practiced without some or all of the specific details and steps disclosed herein.

Aspects of the disclosure may be implemented as a computer-implemented method or as an article of manufacture such as a memory device or non-transitory computer readable storage medium. The computer readable storage medium may be readable by a computer and may comprise instructions for causing a computer to perform processes described in the present disclosure. The computer readable storage medium may be implemented by a volatile computer memory, non-volatile computer memory, hard drive, solid-state memory, flash drive, removable disk, and/or other media. In addition, components of system may be implemented in firmware or hardware.

Conditional language used herein, such as, among others, "can," "could." "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments. The terms "comprising," "including," "having," and the like are synonymous and are used inclusively, in an open-ended fashion, and do not exclude additional elements, features, acts, operations, and so forth.

Disjunctive language such as the phrase "at least one of X, Y, Z," unless specifically stated otherwise, is understood with the context as used in general to present that an item, term, etc., may be either X, Y, or Z, or any combination thereof, e.g., X, Y, and/or Z. Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. At least one computing device for performing fine-scale movement tracking of underwater objects, the at least one computing device comprising:
at least one processor; and
at least one memory comprising instructions that, when executed by the at least one processor, cause the at least one computing device to:
receive first data including first timestamps corresponding to first acoustic signals detected using an underwater acoustic receiver, the first acoustic signals propagating from one or more period-unique acoustic transmitters, each of the one or more period-unique acoustic transmitters being implanted in or attached to a different underwater object;

select a first period at which a first period-unique acoustic transmitter, of among a list of known period-unique acoustic transmitters, emits acoustic signals;

generate first raw image data comprising first graphical elements representing the first timestamps, the first raw image data having:
　a first axis corresponding to linear time, and
　a second axis having a magnitude corresponding to the first period;

process, using a first machine learning (ML) model, the first raw image data to generate segmented image data comprising second graphical elements, wherein the second graphical elements are a subset of the first graphical elements determined by the first ML model to correspond to the first period;

generate raw zoom image data corresponding to a portion of the segmented image data comprising the second graphical elements;

process, using a second ML model, the raw zoom image data to generate segmented zoom image data comprising third graphical elements, wherein the third graphical elements are a subset of the second graphical elements determined by the second ML model to correspond to the first period; and output second data indicating a portion, of the first timestamps, corresponding to the third graphical elements.

2. The at least one computing device of claim 1, wherein the first ML model generates a separate score for each graphical element in the segmented image data, wherein the segmented image data has the first axis and the second axis, and wherein the at least one memory further comprises instructions that, when executed by the at least one processor, further cause the at least one computing device to:
　identify the second graphical elements based on the second graphical elements being associated with scores that each satisfy a condition; and
　generate the raw zoom image data to include the first axis and the second axis zoomed in with respect to the second graphical elements.

3. The at least one computing device of claim 1, wherein the second ML model generates a separate score for each graphical element in the segmented zoom image data, and wherein the at least one memory further comprises instructions that, when executed by the at least one processor, further cause the at least one computing device to:
　identify the third graphical elements based on the third graphical elements being associated with scores that each satisfy a condition; and
　output the second data to indicate the portion, of the first timestamps, corresponding to the third graphical elements based on the third graphical elements being associated with the scores that each satisfy the condition.

4. The at least one computing device of claim 1, wherein the at least one memory further comprises instructions that, when executed by the at least one processor, further cause the at least one computing device to:
　select a timestamp of the first timestamps;
　determine time differences between the timestamp and other timestamps of the first timestamps;
　determine that at least one time difference, of the time differences, corresponds to an integer multiple of the first period;
　generate, based on determining that the at least one time difference corresponds to the integer multiple of the first period, period filter image data comprising a graphical element representing the timestamp, the period filter image data having the first axis and the second axis; and
　further process, using the first ML model, the period filter image data to generate the segmented image data.

5. The at least one computing device of claim 1, wherein the at least one memory further comprises instructions that, when executed by the at least one processor, further cause the at least one computing device to:
　select a timestamp of the first timestamps;
　determine time differences between the timestamp and other timestamps of the first timestamps;
　determine that at least one time difference, of the time differences, corresponds to a subcode of the first period;
　generate, based on determining that the at least one time difference corresponds to the subcode, subcode filter image data comprising a graphical element representing the timestamp; and
　further process, using the first ML model, the subcode filter image data to generate the segmented image data.

6. The at least one computing device of claim 1, wherein the at least one memory further comprises instructions that, when executed by the at least one processor, further cause the at least one computing device to:
　select a graphical element from among the second graphical elements represented in the segmented image data;
　determine time differences between the graphical element and other graphical elements of the second graphical elements;
　determine that at least one time difference, of the time differences, corresponds to an integer multiple of the first period;
　generate, based on determining that the at least one time difference corresponds to the integer multiple of the first period, period filter zoom image data comprising the graphical element; and
　further process, using the second ML model, the period filter zoom image data to generate the segmented zoom image data.

7. The at least one computing device of claim 1, wherein the at least one memory further comprises instructions that, when executed by the at least one processor, further cause the at least one computing device to:
　select a graphical element from among the second graphical elements represented in the segmented image data;
　determine time differences between the graphical element and other graphical elements of the second graphical elements;
　determine that at least one time difference, of the time differences, corresponds to a subcode of the first period;
　generate, based on determining that the at least one time difference corresponds to the subcode, subcode filter zoom image data comprising the graphical element; and
　further process, using the second ML model, the subcode filter zoom image data to generate the segmented zoom image data.

8. The at least one computing device of claim 1, wherein the at least one memory further comprises instructions that, when executed by the at least one processor, further cause the at least one computing device to:

receive third data representing second timestamps corresponding to second acoustic signals emitted from a second period-unique acoustic transmitter at a second period;
generate second raw image data comprising fourth graphical elements representing the second timestamps, the second raw image data having:
a first axis corresponding to linear time, and
a second axis having a magnitude corresponding to the second period;
generate third raw image data comprising fifth graphical elements corresponding to the fourth graphical elements offset by a value with respect to the second axis of the second raw image data; and
generate the first ML model using the third raw image data.

9. The at least one computing device of claim 1, wherein the at least one memory further comprises instructions that, when executed by the at least one processor, further cause the at least one computing device to:
receive third data representing second timestamps corresponding to second acoustic signals emitted from a second period-unique acoustic transmitter;
select a portion of the second timestamps;
determine time differences between neighboring timestamps in the portion of the second timestamps;
determine a sum of the time differences;
generate at least a first timestamp by multiplying the sum of the time differences by v/c, wherein v is a speed representative of motion of an underwater object and c is the approximate speed of sound in water;
generate third timestamps comprising the second timestamps and the first timestamp; and
generate the second ML model based on the third timestamps.

10. The at least one computing device of claim 1, wherein at least one of the first ML model and the second ML model is a neural network.

11. A computer-implemented method for performing fine-scale movement tracking of underwater objects, the computer-implemented method comprising:
receiving first data including first timestamps corresponding to first acoustic signals detected using an underwater acoustic receiver, the first acoustic signals propagating from one or more period-unique acoustic transmitters, each of the one or more period-unique acoustic transmitters being implanted in or attached to a different underwater object;
selecting a first period at which a first period-unique acoustic transmitter, of among a list of known period-unique acoustic transmitters, emits acoustic signals;
generating first raw image data comprising first graphical elements representing the first timestamps, the first raw image data having:
a first axis corresponding to linear time, and
a second axis having a magnitude corresponding to the first period;
processing, using a first machine learning (ML) model, the first raw image data to generate segmented image data comprising second graphical elements, wherein the second graphical elements are a subset of the first graphical elements determined by the first ML model to correspond to the first period;
generating raw zoom image data corresponding to a portion of the segmented image data comprising the second graphical elements;
processing, using a second ML model, the raw zoom image data to generate segmented zoom image data comprising third graphical elements, wherein the third graphical elements are a subset of the second graphical elements determined by the second ML model to correspond to the first period; and
outputting second data indicating a portion, of the first timestamps, corresponding to the third graphical elements.

12. The computer-implemented method of claim 11, wherein the first ML model generates a separate score for each graphical element in the segmented image data, wherein the segmented image data has the first axis and the second axis, and wherein the computer-implemented method further comprises:
identifying the second graphical elements based on the second graphical elements being associated with scores that each satisfy a condition; and
generating the raw zoom image data to include the first axis and the second axis zoomed in with respect to the second graphical elements.

13. The computer-implemented method of claim 11, wherein the second ML model generates a separate score for each graphical element in the segmented zoom image data, and wherein the computer-implemented method further comprises:
identifying the third graphical elements based on the third graphical elements being associated with scores that each satisfy a condition; and
outputting the second data to indicate the portion, of the first timestamps, corresponding to the third graphical elements based on the third graphical elements being associated with the scores that each satisfy the condition.

14. The computer-implemented method of claim 11, further comprising:
selecting a timestamp of the first timestamps;
determining time differences between the timestamp and other timestamps of the first timestamps;
determining that at least one time difference, of the time differences, corresponds to an integer multiple of the first period;
generating, based on determining that the at least one time difference corresponds to the integer multiple of the first period, period filter image data comprising a graphical element representing the timestamp, the period filter image data having the first axis and the second axis; and
further processing, using the first ML model, the period filter image data to generate the segmented image data.

15. The computer-implemented method of claim 11, further comprising:
selecting a timestamp of the first timestamps;
determining time differences between the timestamp and other timestamps of the first timestamps;
determining that at least one time difference, of the time differences, corresponds to a subcode of the first period;
generating, based on determining that the at least one time difference corresponds to the subcode, subcode filter image data comprising a graphical element representing the timestamp; and
further processing, using the first ML model, the subcode filter image data to generate the segmented image data.

16. The computer-implemented method of claim 11, further comprising:

selecting a graphical element from among the second graphical elements represented in the segmented image data;
determining time differences between the graphical element and other graphical elements of the second graphical elements;
determining that at least one time difference, of the time differences, corresponds to an integer multiple of the first period;
generating, based on determining that the at least one time difference corresponds to the integer multiple of the first period, period filter zoom image data comprising the graphical element; and
further processing, using the second ML model, the period filter zoom image data to generate the segmented zoom image data.

17. The computer-implemented method of claim 11, further comprising:
selecting a graphical element from among the second graphical elements represented in the segmented image data;
determining time differences between the graphical element and other graphical elements of the second graphical elements;
determining that at least one time difference, of the time differences, corresponds to a subcode of the first period;
generating, based on determining that the at least one time difference corresponds to the subcode, subcode filter zoom image data comprising the graphical element; and
further processing, using the second ML model, the subcode filter zoom image data to generate the segmented zoom image data.

18. The computer-implemented method of claim 11, further comprising:
receiving third data representing second timestamps corresponding to second acoustic signals emitted from a second period-unique acoustic transmitter at a second period;
generating second raw image data comprising fourth graphical elements representing the second timestamps, the second raw image data having:
a first axis corresponding to linear time, and
a second axis having a magnitude corresponding to the second period;
generating third raw image data comprising fifth graphical elements corresponding to the fourth graphical elements offset by a value with respect to the second axis of the second raw image data; and
generating the first ML model using the third raw image data.

19. The computer-implemented method of claim 11, further comprising:
receiving third data representing second timestamps corresponding to second acoustic signals emitted from a second period-unique acoustic transmitter;
selecting a portion of the second timestamps;
determining time differences between neighboring timestamps in the portion of the second timestamps;
determining a sum of the time differences;
generating at least a first timestamp by multiplying the sum of the time differences by v/c, wherein v is a speed representative of motion of an underwater object and c is the approximate speed of sound in water;
generating third timestamps comprising the second timestamps and the first timestamp; and
generating the second ML model based on the third timestamps.

20. The computer-implemented method of claim 11, wherein at least one of the first ML model and the second ML model is a neural network.

21. At least one non-transitory computer-readable medium encoded with instructions that, when executed by at least one processor of at least one computing device, cause the at least one computing device to:
receive first data including first timestamps corresponding to first acoustic signals detected using an underwater acoustic receiver, the first acoustic signals propagating from one or more period-unique acoustic transmitters, each of the one or more period-unique acoustic transmitters being implanted in or attached to a different underwater object;
select a first period at which a first period-unique acoustic transmitter, of among a list of known period-unique acoustic transmitters, emits acoustic signals;
generate first raw image data comprising first graphical elements representing the first timestamps, the first raw image data having:
a first axis corresponding to linear time, and
a second axis having a magnitude corresponding to the first period;
process, using a first machine learning (ML) model, the first raw image data to generate segmented image data comprising second graphical elements, wherein the second graphical elements are a subset of the first graphical elements determined by the first ML model to correspond to the first period;
generate raw zoom image data corresponding to a portion of the segmented image data comprising the second graphical elements;
process, using a second ML model, the raw zoom image data to generate segmented zoom image data comprising third graphical elements, wherein the third graphical elements are a subset of the second graphical elements determined by the second ML model to correspond to the first period; and
output second data indicating a portion, of the first timestamps, corresponding to the third graphical elements.

22. The at least one non-transitory computer-readable medium of claim 21, wherein the first ML model generates a separate score for each graphical element in the segmented image data, wherein the segmented image data has the first axis and the second axis, and wherein the instructions that, when executed by the at least one processor, further cause the at least one computing device to:
identify the second graphical elements based on the second graphical elements being associated with scores that each satisfy a condition; and
generate the raw zoom image data to include the first axis and the second axis zoomed in with respect to the second graphical elements.

23. The at least one non-transitory computer-readable medium of claim 21, wherein the second ML model generates a separate score for each graphical element in the segmented zoom image data, and wherein the instructions that, when executed by the at least one processor, further cause the at least one computing device to:
identify the third graphical elements based on the third graphical elements being associated with scores that each satisfy a condition; and
output the second data to indicate the portion, of the first timestamps, corresponding to the third graphical elements based on the third graphical elements being associated with the scores that each satisfy the condition.

24. The at least one non-transitory computer-readable medium of claim 21, wherein the instructions that, when executed by the at least one processor, further cause the at least one computing device to:
select a timestamp of the first timestamps;
determine time differences between the timestamp and other timestamps of the first timestamps;
determine that at least one time difference, of the time differences, corresponds to an integer multiple of the first period;
generate, based on determining that the at least one time difference corresponds to the integer multiple of the first period, period filter image data comprising a graphical element representing the timestamp, the period filter image data having the first axis and the second axis; and
further process, using the first ML model, the period filter image data to generate the segmented image data.

25. The at least one non-transitory computer-readable medium of claim 21, wherein the instructions that, when executed by the at least one processor, further cause the at least one computing device to:
select a timestamp of the first timestamps;
determine time differences between the timestamp and other timestamps of the first timestamps;
determine that at least one time difference, of the time differences, corresponds to a subcode of the first period;
generate, based on determining that the at least one time difference corresponds to the subcode, subcode filter image data comprising a graphical element representing the timestamp; and
further process, using the first ML model, the subcode filter image data to generate the segmented image data.

26. The at least one non-transitory computer-readable medium of claim 21, wherein the instructions that, when executed by the at least one processor, further cause the at least one computing device to:
select a graphical element from among the second graphical elements represented in the segmented image data;
determine time differences between the graphical element and other graphical elements of the second graphical elements;
determine that at least one time difference, of the time differences, corresponds to an integer multiple of the first period;
generate, based on determining that the at least one time difference corresponds to the integer multiple of the first period, period filter zoom image data comprising the graphical element; and
further process, using the second ML model, the period filter zoom image data to generate the segmented zoom image data.

27. The at least one non-transitory computer-readable medium of claim 21, wherein the instructions that, when executed by the at least one processor, further cause the at least one computing device to:
select a graphical element from among the second graphical elements represented in the segmented image data;
determine time differences between the graphical element and other graphical elements of the second graphical elements;
determine that at least one time difference, of the time differences, corresponds to a subcode of the first period;
generate, based on determining that the at least one time difference corresponds to the subcode, subcode filter zoom image data comprising the graphical element; and
further process, using the second ML model, the subcode filter zoom image data to generate the segmented zoom image data.

28. The at least one non-transitory computer-readable medium of claim 21, wherein the instructions that, when executed by the at least one processor, further cause the at least one computing device to:
receive third data representing second timestamps corresponding to second acoustic signals emitted from a second period-unique acoustic transmitter at a second period;
generate second raw image data comprising fourth graphical elements representing the second timestamps, the second raw image data having:
a first axis corresponding to linear time, and
a second axis having a magnitude corresponding to the second period;
generate third raw image data comprising fifth graphical elements corresponding to the fourth graphical elements offset by a value with respect to the second axis of the second raw image data; and
generate the first ML model using the third raw image data.

29. The at least one non-transitory computer-readable medium of claim 21, wherein the instructions that, when executed by the at least one processor, further cause the at least one computing device to:
receive third data representing second timestamps corresponding to second acoustic signals emitted from a second period-unique acoustic transmitter;
select a portion of the second timestamps;
determine time differences between neighboring timestamps in the portion of the second timestamps;
determine a sum of the time differences;
generate at least a first timestamp by multiplying the sum of the time differences by v/c, wherein v is a speed representative of motion of an underwater object and c is the approximate speed of sound in water;
generate third timestamps comprising the second timestamps and the first timestamp; and
generate the second ML model based on the third timestamps.

30. The at least one non-transitory computer-readable medium of claim 21, wherein at least one of the first ML model and the second ML model is a neural network.

* * * * *